United States Patent [19]

Lin, deceased et al.

[11] 4,442,542
[45] Apr. 10, 1984

[54] PREPROCESSING CIRCUITRY APPARATUS FOR DIGITAL DATA

[75] Inventors: Ta-Tung Lin, deceased, late of Harleysville, Pa.; by Meei H. Lin, Executrix, North Wales, Pa.; George A. Fedde, Perkiomenville, Pa.

[73] Assignee: Sperry Corporation, New York, N.Y.

[21] Appl. No.: 344,245

[22] Filed: Jan. 29, 1982

[51] Int. Cl.³ .............................................. G06K 9/46
[52] U.S. Cl. .......................................... 382/8; 382/25
[58] Field of Search ..................... 382/8, 55, 25, 41, 9; 358/106, 101, 107

[56] References Cited

U.S. PATENT DOCUMENTS

| | | | |
|---|---|---|---|
| 3,432,673 | 3/1969 | Mader | 382/67 |
| 3,898,617 | 8/1975 | Kashioka et al. | 382/8 |
| 4,152,723 | 5/1979 | McMahon et al. | 358/106 |
| 4,223,387 | 9/1980 | Danielsson et al. | 382/8 |
| 4,300,122 | 11/1981 | McMahon | 382/8 |

*Primary Examiner*—Leo H. Boudreau
*Assistant Examiner*—E. A. McDowell
*Attorney, Agent, or Firm*—James R. Bell; Marshall M. Truex

[57] ABSTRACT

An apparatus for analyzing line sequential binary data generated by scanning a printed circuit board with a scanning laser apparatus is disclosed. The circuit board contains conducting strips on an electrically insulated substrate. The conductors can be characterized by the number and the locations of their corners and by their widths and by the widths of the substrate occurring between parallel and spaced apart conductors. The line sequential data when viewed together forms a two dimensional image array of the circuit board and the two dimensional array contains information about the conducting corners, widths, etc. The line sequential binary data is first smoothed by smoothing circuits to eliminate errors due to noise, scanning equipment tolerances, etc. Then the smoothed data in line sequential format is transmitted to a corner recognition and pairing circuit where the corner features of the conductors are recognized. Because of digitizing errors, a corner feature often appears as two, three or more vertically and/or horizontally adjacent corner pairs. The excess corners are eliminated by the corner recognition and pairing circuit. At the same time, a line/space width error detection circuit portion of the apparatus examines the widths of the horizontal and vertically directed conducting strips and the spaces between them. If any of the conductors or spaces fall below a predetermined minimum over a predetermined length of the conductor or strip an error signal is generated.

5 Claims, 27 Drawing Figures

PREPROCESSING CIRCUITRY APPARATUS FOR DIGITAL DATA

RELATED APPLICATIONS

This application is related to U.S. application Ser. No. 25,702 filed Apr. 2, 1979, entitled "Apparatus For Processing Digital Data Representative of A Two Dimensional Image" and assigned to a common assignee.

BACKGROUND OF THE INVENTION

The present invention relates to an apparatus for analyzing lines of sequential binary data which lines of data if viewed together form a two dimensional image array. The binary data may be formed initially by scanning an object with a scanning apparatus in a plurality of parallel scans. The binary data is representative of features present on the object When it is desired to process binary data derived from a scanned object or the like, it is preferable to represent the features present therein by the smallest possible amount of data. This reduces the required memory capacity where the data is subsequently processed by computer and also reduces processing time, since the amount of data to be processed is minimal.

One system for producing lines of sequential binary data for analyzing the electrical conductor pattern on a circuit board is disclosed in U.S. Pat. No. 4,152,723 in the names of Donald H. McMahon and Colin G. Whitney. In that system, a beam of light scans over the surface of the circuit board in sequential parallel scans to illuminate the conductors (comprising the pattern) and the insulating substrate on which they are disposed. When the beam is incident on an exposed portion of the insulating substrate, a fluorescent emission therefrom is detected and a binary signal having a first state is generated by the apparatus. When the beam is incident on a conductor, no fluorescent emission results and the apparatus produces a binary signal of a second state complementary to the first state. By synchronizing the scans of the beam with the binary signals produced by the apparatus, lines of sequential binary data representative of the conductor patterns on the circuit board are generated.

Such an apparatus is capable of producing a vast amount of data. For example, where the scanning beam has a one mil resolution, a total of 1.6 billion bits of data are generated by the scanning apparatus when scanning the entire surface of a forty inch square circuit board.

Such a large amount of data is not only representative of the real conductor pattern of the board, but also includes false data resulting from sources of error such as optical noise, nonuniform motion of the scanner caused by bearing tolerances (bearing noise), and problems associated with image quantization. Bearing noise in the scanner system results in a mechanical shift in scanner position which gives the appearance of a jog or corner in the conducting pattern of the board where in fact there is no such jog. Image quantization is the operation of assigning a discrete binary value to each of the signals formed by the operation of the scanning apparatus. Due to limits of resolution, the scanning beam at a given point in time may fall upon an edge of a conductor such that only a portion of the beam is incident on the metal while another portion is incident upon the substrate. At such an occurrence only one binary value will be assigned representing an illuminated portion of the circuit board comprising both conductor and substrate. Also, since the fluorescent emission detected by the scanning apparatus is at a very low level, the presence of optical or electrical noise may cause the scanning apparatus to generate either one binary signal level or its complement without regard to the actual nature of the portion of the circuit board being scanned A system for processing lines of sequential binary data representive of conductors present when an object is scanned is disclosed U.S. Pat. No. 4,300,122 in the name of Donald H. McMahon. McMahon discloses an apparatus comprising a smoothing circuit which is operative to form and examine a 3×3 array of binary signals which can be thought of as chosen from portions of adjacent rows and columns of a two dimensional image array, which two dimensional array would be formed by viewing together a plurality of lines of sequential binary signals generated by a scanning apparatus. The smoothing circuit assigns a binary value to the center signal location of the 3×3 array based upon whether the total number of adjacent signals in the 3×3 array having a given binary value exceeds a predetermined number. This smoothing operation is performed for a 3×3 group of signals with each new binary signal received from the scanning apparatus. The signals at the center signal location of the 3×3 array with newly assigned binary values are provided in sequence to a coding circuit. The assigned binary signals representing smoothed data, if viewed together provide a two dimensional, smoothed image array of binary data.

The apparatus of McMahon is further capable of reducing the vast amount of data generated, as described above, by characterizing the conductor pattern on the surface of the board as a plurality of conductor/substrate corner features of predetermined types. Each corner feature is assigned a corner code by a coding circuit of the apparatus.

McMahon's coding circuit is operative to arrange the assigned binary valued center signals into 2×2 matrices formed from portions of adjacent rows and columns of the smoothed image array and to examine each matrix to detect therein one of several possible binary signal patterns each of which represents a different one of the plurality of conductor/substrate corner features. In the preferred embodiment, there are eight discrete patterns used for characterizing the conductor/substrate corner features on the circuit board.

Errors inherent in a scanning system such as those errors described earlier will cause the conductor pattern on the circuit board to be characterized in some places as comprising extra corner features occurring as one or more adjacent corner feature pairs where in fact only one or no corner feature is present. These extra corner features are recognized and eliminated by the apparatus as taught by McMahon.

In the data processing apparatus of the above identified McMahon patent application, one or more shift registers are required by both the smoothing circuit and coding circuit to form the 3×3 and 2×2 arrays of data. These shift registers are required to have a capacity equal to the number of data points in each scan line. Optical scanning of large circuit boards produces shift line scans containing thirty thousand bits or more. Hence, the design and management of the shift registers become an important factor in the success of the processing apparatus in reducing the burden of processing large amounts of data.

In the above identified McMahon application, the operations of generating the corner codes and then eliminating erroneous, redundant adjacent corner features are done sequentially. It is desirable to accomplish these tasks as quickly as possible without increasing complexity. This will further reduce processing time.

It is also desirable to monitor the width of conductors and the width of spaces between parallel and spaced apart conductors (hereinafter called space strips) present on the circuit board and to generate an error signal if the widths vary from specification.

The majority logic used with the smoothing circuits of the McMahon application works well but has a tendency to degrade resolution of the image. Other improved means for smoothing data without degradation to the image resolution is desirable.

SUMMARY OF THE INVENTION

The present invention provides an apparatus for analyzing lines of binary data in a sequential format which lines of data if viewed together form a two dimensional image array of binary data indicative of the presence of distinguishable features of an object being scanned. Where the object being scanned is a printed circuit board, such features include corners of conductors and the width of conductor strips and space strips present on the object. While the present invention may be used to simply detect features of a conducting path, the present embodiment is employed with a system whereby when the features are detected they are matched against a standard to determine if the features have a correct relative location compared to adjacent features.

In one embodiment, the apparatus comprises: a data arraying means for providing corner arrays of output signals from binary signals produced by a scanning apparatus, the binary signals representing identifying features of an object being scanned, each corner array being representative of the binary data in overlapping rectangular portions of adjacent rows and columns of the two-dimensional image array; and corner code generating means connected in parallel to receive a plurality of selected signals selected from a corner array of output signals for generating corner code signals which are indicative of the presence of corner features contained in the selected signals. The corner code generating means transmits the corner code signals in response to an enable signal which is received from an excess code elimination means. The excess code elimination means is connected in parallel to the arraying means to receive the corner array of output signals. When the corner array of output signals indicates the presence of an adjacent corner pair the excess code elimination means disables the output of the corner code generating means so that corner code signals are not transmitted therefrom. If an adjacent corner pair is not indicated by the corner array of output signals then an enable signal is provided from the excess code elimination means to the corner code generating means enabling the corner code generating means to transmit corner code signals which are indicative of the presence of a corner feature in the selected signals chosen from the corner array of output signals.

The arraying means comprises a first delay means which is coupled to the scanning apparatus and provides output signals to a second delay means. The first and second delay means are both operative to provide an output signal which is representative of a data bit vertically adjacent to the input data bit (represented by an input binary signal) of the first and second delay means respectively. In the preferred embodiment the arraying or first delay means comprises a serial to parallel shift register which converts the serial binary signals into byte format, each byte containing a plurality of bit binary signals. The serial to parallel shift register transmits the binary signals of each byte in parallel to a memory or second delay means which stores a complete scan line in byte format. Byte by byte the output signals of the memory are provided to another memory and to a parallel to serial register which register converts the bytes back to serial binary signals.

In a further embodiment of the present invention, the apparatus comprises an arraying means disposed to receive binary signals from the scanning apparatus, the arraying means for providing a diagnostic array of output signals representative of binary data in overlapping rectangular and first and second linear portions of adjacent rows and columns of the two-dimensional image array. The apparatus further comprises a line/space width error detector which is connected to the arraying means to receive first and second substantially orthogonal linear array portions of the signals of the diagnostic array. The line/space width error detector is operative to detect when the width of a linear conductor strip or a linear space strip varies from a predetermined specification. The line/space width error detector means produces an error signal when the width of a strip is less than some predetermined minimum. The arraying means comprises a plurality of delay means which, in the preferred embodiment, are formed using memories as discussed above.

DETAILED DESCRIPTION OF THE INVENTION

It should be borne in mind that the present invention is directed to a means for electronically determining features of an object being optically scanned. It should also be understood that the embodiments described to illustrate the invention are arrangements for determining the presence of corners of circuit paths and the width of said paths so that those features can be compared with stored reference data so that if there is a discrepancy therebetween the manufacturer of the circuit path (boards) can take appropriate measures.

Figures 1A, 1B:
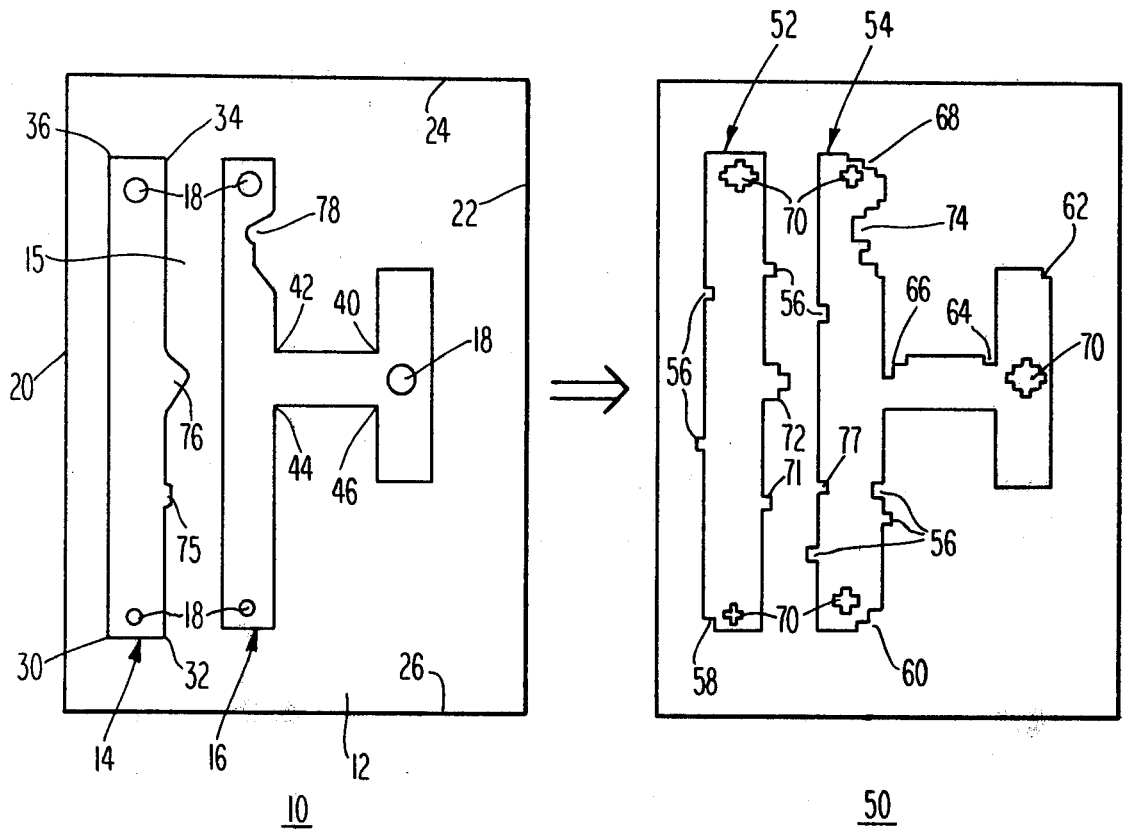
FIGS. 1a and 1b are, respectively, a diagrammatic view of a printed circuit board and a two-dimensional binary data point image thereof.

FIG. 1a illustrates a printed circuit board designated generally 10 having a substrate 12 comprised of an insulating material, such as epoxy glass. Attached to one surface of substrate 12 is a pattern of metallic conductors designated generally 14 and 16 to which various circuit components may be conductively affixed and thereby electrically connected to other circuit components. Apertures 18 extend through the substrate and metallic conductors to permit conductive leads from the various circuit components normally mounted on the opposing side of substrate 12, to pass through the substrate 12 and metallic conductors 14 and 16, to which they are conductively affixed by soldering.

The above-mentioned U.S. Pat. No. 4,152,723 discloses a scanning apparatus for producing a line sequential digital image of the surface of a circuit board, such as that shown in FIG. 1a, to which conductive patterns are affixed. In operation, the scanning system commences a scanning operation of the circuit board of FIG. 1a by causing a beam of light to scan across the surface of the board from a first edge 20 to a second edge 22. The first scan follows a path adjacent a third edge 24 of circuit board 10 disposed at right angles to edges 20 and 22. Subsequent scans are made parallel to said first scan, each subsequent scan being adjacent the next preceding scan such that the light beam describes a line sequential pattern of scans beginning along a path adjacent edge 24 and continuing to a final scan adjacent an edge 26 of circuit board 10 A master clock pulse train depicted as waveform 1402 in FIG. 14, for synchronizing the generation of digital signals derived from fluorescent emissions from the scanned surfaces of circuit 10 with the position of the scanning light beam, may be derived directly from the scanning light beam as described in the U.S. Pat. No. 4,152,723, or by a position encoder connected to the shaft of a scanning mirror used to scan the light beam. In the preferred embodiment, a position encoder is used which provides a zero reference signal (see lead 1400, FIG. 14) before the start of scan of the printed circuit board. The position encoder further provides a 12,000 cycle clocking signal (not shown) as the scanning mirror rotates, which clocking signal drives a phase locked loop with a voltage controlled oscillator to produce the master clock 1402.

As described in U.S. Pat. No. 4,152,723, when the light beam impinges on the epoxy substrate 12, the substrate fluoresces, a plurality of photo multiplier tubes detects the emitted light, and digitizing circuitry connected thereto provides an output signal at a first binary level or state. When the beam of light impinges on the conductors 14 and 16 no fluorescence occurs and the digitizing circuitry provides an output signal having a binary state complementary to the first state. The output of the digitizing circuitry is sampled by the output signals of a pixel clock, available on lead 1403 in FIG. 14, which is derived from the master clock available on lead 1402. In the preferred embodiment, the master clock (8 MHz) is divided by three to generate a 2.67 MHz pixel clock.

The combination of the laser beam size (cross-sectional area of the beam at the point of impact on the circuit board) and the 2.67 MHz pixel clock results in a bit stream of binary signals, which signals represent image samples of the circuit board, each of which image samples corresponds to a portion of the circuit board having an area of one square mil. These image samples are called pixels and the binary signals generated from scanning them are called pixel signals.

The conductors 14 and 16 can be characterized by the number, location and orientation of conductor/substrate corner features and by the conductor widths and separations from one another. With respect to the corner features, the conductor 14 has outer corners 30, 32, 34 and 36 while conductor 16 has inner corners 40, 42, 44 and 46. As will be explained in more detail hereinafter, in the preferred embodiment, it requires a 2×2 array of pixels (four square mils) to represent one of the above mentioned corners. The corners 30, 32, 34, 36, 40, 42, 44 and 46 are represented by the pixel patterns shown in FIGS. 4a through 4h, respectively.

FIG. 1b shows a two dimensional binary data image 50 of the circuit board 10 of FIG. 1a that would be provided if a plurality of laser scans of the circuit board 10 of FIG. 1a were viewed together. The image 50 is that which would be provided if the processing circuitry of this invention were not used. In FIG. 1b, the images of conductors 14 and 16 are designated generally 52 and 54, respectively. The images contain false data resulting from sources of error described earlier. For example, bearing noise in the scanner system cause a shift in the scanner position either in a direction of a fast or slow scan. This results in an off set in the image and the appearance of a jog or corners 56 on the surface of the board where in fact there is no such feature. Because of ambiguity in the digitizing process of a video signal, the outer and inner corner features of the conductors 14 and 16 might contain additional unwanted corner features such as those shown in image corners 58, 60, 62, 64, 66, and 68. Again, because of the digitizing process, curved or circular lines in the conductors 14 and 16 are digitized to provide an excess of corner features. Note the images 70 of apertures 18 and the images 72 and 74 of conductor defects 76 and 78. Feature image 71 on conductor image 52 is a digitized true image of the small imperfection 75 in FIG. 1a.

Figure 2:
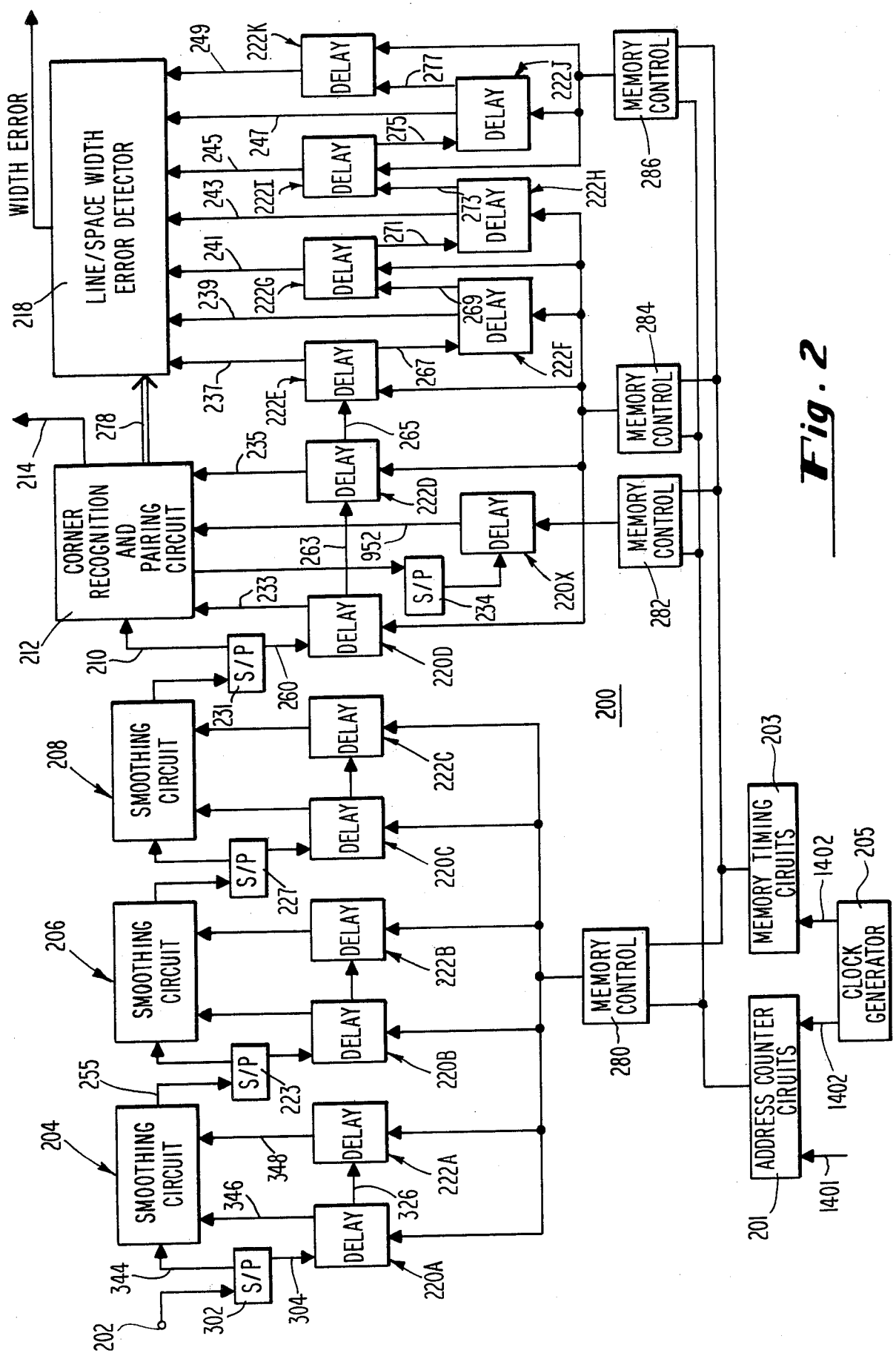
FIG. 2 is a block diagram of the preferred embodiment of the present invention.

FIG. 2 shows a block diagram of the preferred embodiment preprocessing apparatus designated generally 200. Serial binary signals, each representing a pixel, derived from the scanning apparatus are applied to the circuit of FIG. 2 at input terminal 202. Three stages of smoothing circuitry designated generally 204, 206 and 208 are provided primarily to offset the effect of bearing noise, certain digitizing errors and shot noise in the photo multiplier tubes in the scanning apparatus. These effects would tend to degrade the acquired image as illustrated by the false pixel data 56 in FIG. 1b. The smoothed data in serial format is then applied over a lead 210 to a corner recognition and pairing circuitry 212 where corner features are detected.

A substantial portion of the corner features detected are erroneous and are due to ambiguities caused by the digitizing process of the video signal in the scanner apparatus. See corner images 58, 60, 62, 64 66 and 68 and image regions 72 and 74 in FIG. 1b. These excess corner features are eliminated by pairing vertically and horizontally adjacent corner features in the corner recognition and pairing circuitry 212, a process to be described in detail hereinafter. The remaining corner features are assigned a code and the codes are transmitted over a bus 214 to a data utilization means such as a data processing unit where the codes are checked against a predetermined table of corner codes associated with the printed circuit board undergoing inspection.

At the same time that corner features are being detected and analyzed, a line/space width error detector 218 examines the conductor widths and space widths. Widths of the conductors and spaces which are less than a predetermined minimum cause detector 218 to generate an error signal. However, small variations in conductor or space widths which are no greater than one mil in length (such as image 71 of defect 75 in FIGS. 1b and 1a respectively) are ignored by the detector 218.

In the preprocessing apparatus 200 of FIG. 2, a total of sixteen scan lines of data each containing in excess of thirty thousand bits are stored at all times in RAM memories present in the plurality of delay circuits 220(A-D), 220X and 222 (A-K). Each of these delay circuits includes means for delaying a binary signal applied thereto for exactly the same interval of time it takes for the scanning apparatus to complete one scan across the circuit board, i.e. one line scan interval. Delay circuits 220(A-C) and 222(A-C) have outputs connected to plurality of smoothing circuits 204, 206 and 208 respectively. The smoothing circuits include means for generating small two dimensional arrays of binary signals. Each signal array represents an image of a portion of the object being scanned which image is spread over portions of three adjacent parallel scans. As each new pixel signal arrives at terminal 202, the array of signals changes and so does the portion of the circuit board imaged thereby. As the laser scan moves across the circuit board, for example from left to right, the portion of the circuit board being imaged by the array of signals changes from left to right since the pixel signals are derived by sampling the output of digitizing circuitry of the scanning apparatus which output is generated as the laser beam scans the printed circuit board.

The delay circuits 220D, 220X and 222D cooperate with the corner recognition and pairing circuity 212 while delay circuits 222 (E-K) cooperate with a line/space width error detector 218, respectively, to generate other arrays of smoothed binary signals which represent an image of a portion of the circuit board which image changes with each new smoothed binary signal received over line 210.

Each of the delay circuits of FIG. 2 comprises a random access memory (RAM) which requires various control signals such as address signals and read and write commands. These signals and commands are provided by address counter circuits 201 and memory timing circuits 203 in response to master clock pulses 1402 from a clock generator circuit 205. The address and read and write signals are transmitted to memory controllers 280, 282, 284 and 286 which distribute the signals to the delay circuits. Controllers 280, 284, and 286 transmit the same address signals and read and write commands (signals on lines 1406 and lines 1408 and 1410) simultaneously to all delay circuits except delay circuit 220X. Controller 282, assigned only to delay circuit 220X, transmits special address signals 1416 of FIG. 14) to delay circuit 220X over a bus corresponding to bus 1406 in FIG. 3.

Before proceeding further with a description of FIG. 3, the manner in which the address signals on bus 1406 and bus 1416 are generated will be described. The position encoder (not shown) provides a zero reference signal (see lead 1400 in FIG. 14) before the start of the laser scan across the printed circuit board. The zero reference signal is used to generate a reset pulse (1401) which resets a first modulo 4096 counter circuit to address zero. This first counter circuit provides a 3 microsecond address on bus 1406 for both read and write and a 1.5 microsecond address on bus 1416 for read. The reset pulse 1401 further resets a second modulo 4096 counter circuit to a count of 4094 for transmitting a 1.5 microsecond address on bus 1416 for writing into delay circuit 220X. Neither of the address counters is enabled to start counting until the start of the fifth pixel clock signal after the start of the laser scan across the printed circuit board (the left most pixel clock numbered 4 in lead 1403). Thereafter, the counters are incremented every eight pixel clock signals. If there are 30,480 pixel signals applied to terminal 202 by the scanning apparatus for each line scanned, there are 3810 8-bit bytes stored in the RAM's of the delay circuits (at addresses associated therewith) during each line scan. The address counters provide 3810 sequential addresses and the RAMs have their contents at these addresses changed once during each scan line. After a count of 3810 the address counters of circuits 201 are disabled and the counts reset to zero and 4094, respectively, at the next reset pulse 1401. Note that the read address for delay circuit 220X is always two more than the following write address for delay circuit 220X. The read address for delay circuit 220X is the same as simultaneously occurring read addresses for all remaining delay circuits. The 1.5 microsecond read and write addresses on lines 1416 occur within the three microsecond duration of the address on lines 1406 used for both read and write.

Figure 3:
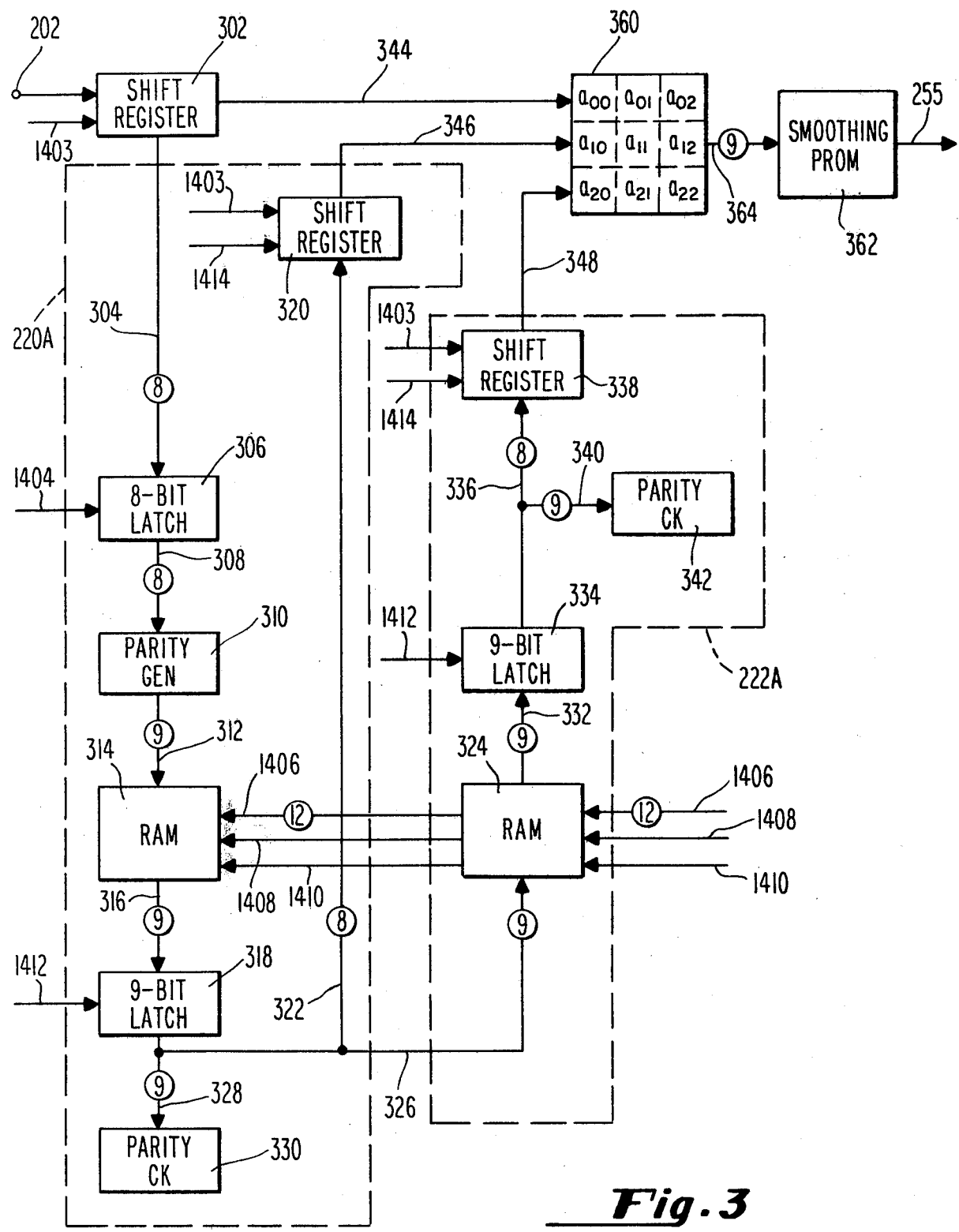
FIG. 3 is a more detailed block diagram of a delay means portion of FIG. 2.
Figure 14:
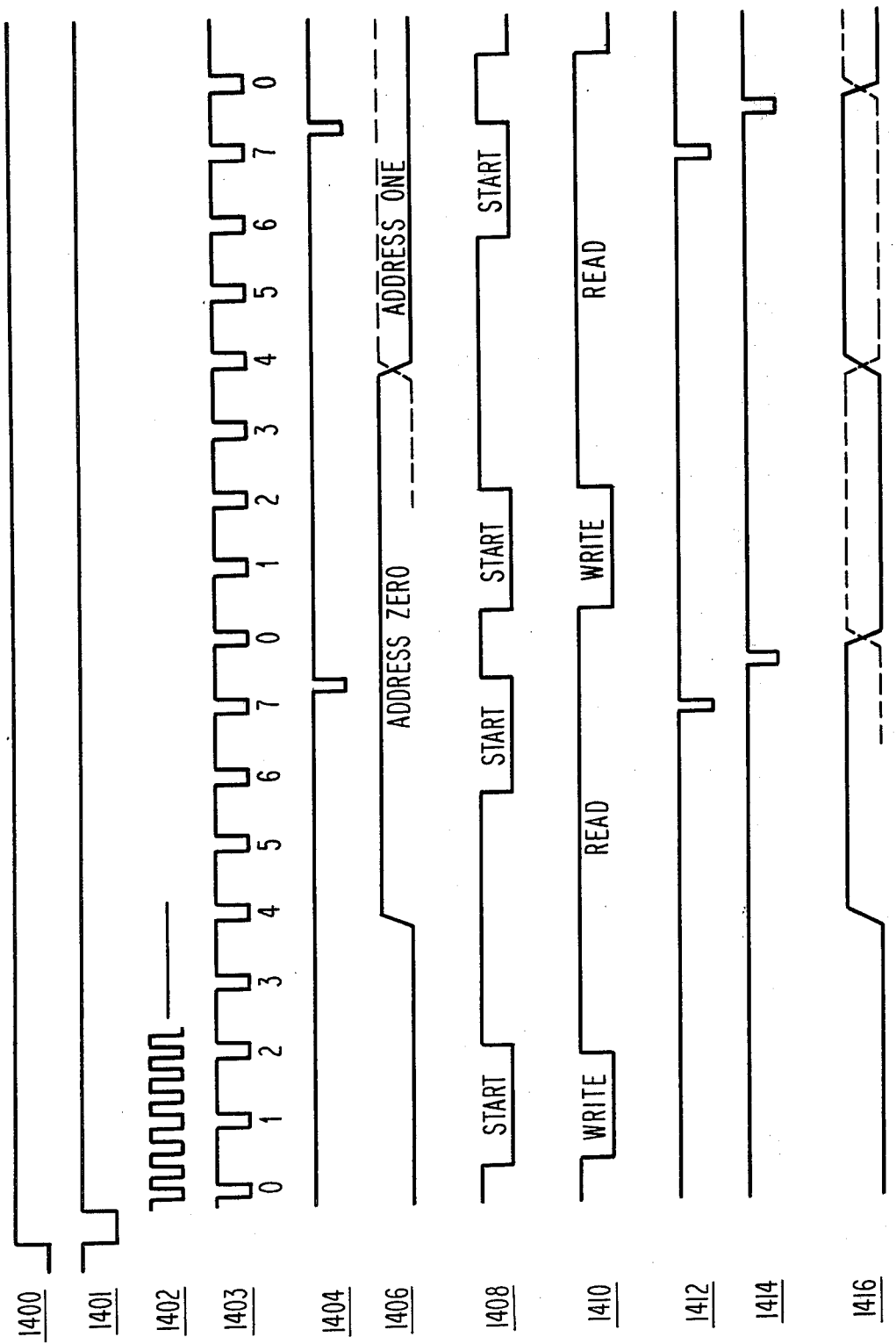
FIG. 14 is a waveform diagram illustrating the relative timing of various signals of the present invention.

Referring now to FIGS. 3 and 14, FIG. 3 shows the details of the delay circuits 220A and 222A. The delay circuits 220(B-D) are like delay circuits 220A whereas the delay circuits 222(B-K) are like delay circuit 222A. Binary signals representing the scanned image are sequentially applied to terminal 202 from the scanning apparatus and are shifted into an eight bit shift register 302 by pixel clock signals which are applied to the shift control input of the register over a lead 1403. After each group of eight binary signals has been shifted into register 302, they are read out in parallel as an eight bit word (byte) over a bus 304 and loaded into an eight bit latch 306 in response to a latch pulse derived from the master clock and applied to the latch over a lead 1404. Immediately thereafter the next binary signal from terminal 202 is shifted into shift register 302 by the next pixel clock pulse. While this is occurring the byte stored in latch 306 is applied over a bus 308 to a parity generator 310 which generates a parity bit for the byte. From parity generator 310 the byte and its parity are applied to a random access memory (RAM) 314 over a bus 312. RAM 314 is byte addressable and is capable of storing 8K bytes, with nine bits to a byte.

From memory controller 280 a twelve bit address via bus 1406; a memory start command via lead 1408 and memory read/write command via lead 1410 are transmitted to RAM 314. The timing and shape of these signals relative to the pixel clock is shown in FIG. 14. Before a word is written into RAM 314 a word must be read therefrom. During the latter part of the shifting of a group of eight pixel signals into shift register 302, a nine bit byte stored in RAM 314 from the previously scanned line, and now located at a particular address is being read from RAM 314. Notice the address on bus 1406 is available during the last four bits of a group being loaded into shift register 302 and during the first four bits of the next group. Then the address is incremented to select a new address. In response to the memory start signal 1408 being low and the memory read signal 1410 being high, the RAM 314 reads out the byte at the address specified by the value on bus 1406. The nine bit output of RAM 314 is connected by a bus 316 to the inputs of a none-bit latch 318. An output latch clock signal is provided on lead 1412 to write into latch 318 the byte being read out of RAM 314. During the last half of the interval that the memory address is present on lines 1406, both the memory start and memory write commands on leads 1408 and 1410 go low and the byte present in latch 306, and its generated parity bit, are loaded into the address in RAM 314 just read out.

The outputs of latch 318 are connected to a parity checker 330 by a bus 328; to the parallel inputs of a shift register 320 by a bus 322; and to a RAM 324 by a bus 326. Soon after latch 318 is loaded, a load register clock signal appearing on lead 1414 is applied to shift register 320 and the contents of latch 318 are loaded in the register. This occurs after the last pixel in a group of eight is loaded into shift register 302 but before the next pixel clock signal arrives which starts loading a new group of eight. The byte now stored in shift register 320 represents eight adjacent pixels on a line scan which line scan is the previous vertically adjacent line scan to the current line scan being provided to shift register 302. Pixel clock signals on lead 1403 shift the shift registers 302 and 320 and the output bits from the registers are applied serially to an array generator 360 over leads 344 and 346, respectively. This process repeats for each group of eight pixels loaded into the serial/parallel register 302 until the scan line is complete. Thus, the RAM 314 enables delay circuit 220A to delay pixel signals for exactly one scan line. Therefore, at each pixel clock signal, the pixel signal shifted out of shift register 302 onto lead 344 occupies the same horizontal position in its scan line as the pixel signal shifted out of shift register 320 onto lead 346 occupies in its scan line. However, the pixel signal on lead 344 is derived from the scan line which follows the scan line wherein the pixel represented by the signal on lead 346 was produced.

In order to simultaneously provide pixel signals derived from a third parallel scan line, a second delay 222A is provided. The delay circuit 222A comprises a RAM 324, having its output connected by a bus 332 to a 9-bit latch 334, by a bus 340 to a parity checker 342 for checking the output signals from latch 334 and by a bus 336 to a shift register 338 having parallel inputs connected to the output of latch 334. RAM 324, latch 334 and shift register 338 are like RAM 314, latch 318 and shift register 320 and receive exactly the same addressing and control signals. Since the input of RAM 324 is connected to the output of latch 318 by a bus 326, and since delay circuit 222A also functions to delay signals for exactly the time it takes the scanning apparatus to scan one line, the pixel signals shifted out of shift register 338 bear the same relationship to the pixel signals on lead 346 as the signals on lead 346 bear to the signals on lead 344. Therefore the output signals from shift registers 302, 320 and 338 applied to the smoothing circuitry 204 (or more specifically to the array generator 360 therein) via leads 344, 346 and 348, respectively, represent three vertically adjacent pixels of three vertically adjacent scan lines of the surface being scanned by the scanning apparatus. That is, as the nth pixel signal of a current scan line is shifted out of shift register 302 via lead 344, the nth pixel signal of the previous scan line is shifted out of shift register 320 via lead 346, where n represents the horizontal position of a pixel in a scan line. Simultaneously, the nth pixel signal of the next previous scan line is shifted out of shift register 338 onto lead 348

It should be clear from the foregoing description that delays of more than two scan lines may be obtained by cascading additional delay circuits like delay circuit 222A in order to make simultaneously available the corresponding pixel signals derived from more than three scans.

The use of delay circuits capable of storing a complete scan line provides the capability of looking at vertically adjacent pixels from parallel and vertically adjacent horizontal scan lines. If it is desired to look at a vertical line of bits across N scan lines at the same instant in time, N−1 delay circuits are required. To advance the vertical lines in a horizontal direction for M positions or M bits so that an N X M array of bits, that is, N bits in the vertical dimension and M bits in the horizontal dimension, can be viewed at the same time, single bit registers can be added in series to the output of the delay circuits.

Figure 6:
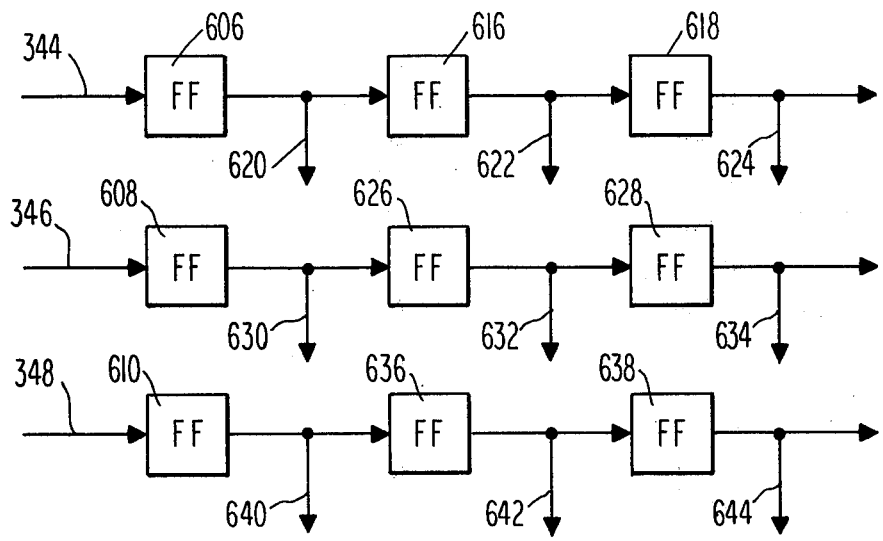
FIG. 6 is a block diagram of an array generator portion of the smoothing circuits of FIG. 2.

FIG. 6 is an example of an array means for providing an N by M array of terminals at which an N by M array of binary signals are present after each pixel clock during a laser scan. Specifically, FIG. 6 illustrates the details of array generator 360 where M=N=3. The array generator 360 together with a programmable read only memory (PROM) 362 in FIG. 3 forms the smoothing circuit 204. The pixel signals shifted out of shift registers 302, 320 (from delay circuit 220A) and 338 (from delay circuit 222A) are transmitted over leads 344, 346 and 348, respectively, to three single bit registers 606, 608 and 610, respectively. The registers may be D flip flops which are clocked by the clocking pulse 1403 (over leads not shown) so that the registers function as additional stages of the shift registers 302, 320 and 338. The register 606 has its output connected to the input of a further register 616 which in turn has its output connected to the input of another register 618. Register 608 has its output connected to the input of a further register 626 which in turn has its output connected to the input of another register 628 while register 610 has its output connected to the input of a further register 636 which in turn has its output connected to the input of another register 638.

The signals representing the current scan line (third line) from shift register 302 arriving at single bit register 606 are delayed by single bit registers 606, 616 and 618

(D flip flops). The output signals of registers 606, 616 and 618 on leads 620, 622 and 624 represent three horizontally adjacent pixels or data bits. Similarly, the previous scan line (second scan line) which was stored in delay circuit 220A is delayed a bit at a time by single bit registers 608, 626 and 628. The output signals of the registers 608, 626 and 628 appearing on leads 630, 632 and 634, respectively represent three horizontally adjacent pixels from the second scan line. Finally the output signals of delay circuit 222A representing the next previous scan line (first line) is delayed one bit at a time by each of registers 610, 636 and 638. The output signals of registers 610, 636 and 638 appearing on leads 640, 642 and 644, respectively, represent three horizontally adjacent pixels from the first scan line. The binary signals at the array of output terminals of the single bit shift registers provide a $3 \times 3$ array of pixel signals or data points after each pixel clock. The $3 \times 3$ array of pixel signals represents an image of a portion of the circuit board surface being scanned by the scanning apparatus. With each new binary signal arriving over lead 202 the output signals of the three by three array are changed to represent an image of a new portion of the circuit board surface offset horizontally from the previously represented image. As the laser beam scans from left to right, the area of the portion of the circuit board surface being imaged by the $3 \times 3$ array of pixel signals moves from left to right.

As has been described above, the serial/parallel shift register 302 and delay circuits 220A and 222A cooperate with the smoothing circuitry 204 comprising array generator 360 and PROM 362. In a similar manner, the serial/parallel shift register 223 and the delay circuits 220B and 222B, and the serial/parallel shift register 227 and the delay circuits 220C and 222C cooperate with the smoothing circuits 206 and 208, respectively. Each of the smoothing circuits 206 and 208 comprises an array generator and PROM identical to array generator 360 and PROM 362 in FIG. 3. The delay means 220B and C are identical to the delay means 220A described in detail with reference to FIG. 3 while the delay means 222B and C are identical to the delay mean 222A.

In FIG. 3, the three by three array of output signals from the array generator 360 is illustrated as a matrix of nine blocks. Each of the blocks is labeled with the letter "a" having two subscripts. The first subscript denotes which scan line the pixel signal belongs to while the second subscript denotes which relative position the pixel signal is in within the scan line. The current pixel signal from the current scan line is labeled $a_{00}$. As the delay increases either by scan line or by pixel signal, the subscript numerals increase accordingly Pixel signal $a_{02}$ represents a pixel signal from terminal 624 which had appeared two clock pulses earlier at terminal 620. Pixel signal $a_{22}$ is a pixel signal from terminal 644 which had appeared two scan lines earlier at terminal 624. At any instant in time the three by three array of pixel signals present at the terminals of array generator 360 represents a portion of the two dimen-sional binary data image array of the object under investigation covering three vertical adjacent scan lines and being three pixel signals wide.

The nine pixel signals of the array generator such as generator 360 in FIG. 3 are transmitted over bus 364 to PROM 362. Each different combination of pixel signals addresses a different storage location in PROM 362 which is a $512 \times 1$ bit PROM. The state of the output signal stored at a given location depends on the algorithm used to program the PROM. The present invention employs two different smoothing algorithms. Smoothing circuitry 204 uses a "majority of five" algorithm as described in detail in U.S. application Ser. No. 25,702 referenced earlier. Briefly, a storage location selected by a combination of nine pixel signals stores a single bit which is zero if 5 or more of the pixel signals are binary zeros (low level), and is a 1 if less than 5 of the pixel signals are zero. The output signals from the PROM represent smoothed pixel signals which are transmitted serially from smoothing circuit 204 to serial/parallel shift register 223 via lead 255 and then serially to smoothing circuit 206 and in parallel to delay circuit 220B. In the preferred embodiment, when the laser light falls upon substrate a high level signal is generated and transmitted along line 202 in FIG. 2. When laser light impinges upon a conductor then a low signal is generated.

In an identical fashion, the smoothing circuitry 206 generates a second three by three array of pixels. The smoothing PROM of smoothing circuitry 206 could be programmed with a majority of five algorithm once again. In U.S. application Ser. No. 25,702 three successive smoothing circuits are used with the majority of five algorithm. However, it has been determined that using only a majority of five algorithm results in degraded image resolution. An alternate approach is to use a "salt and pepper" algorithm programmed into the smoothing circuitry PROM in smoothing circuits 206 and 208 which filters out the "white" and "black" noise. The smoothing circuits 206 and 208 each act on a $3 \times 3$ array formed from the smoothed pixels transmitted from the previous smoothing circuitry.

The combined salt and pepper algorithm is implemented by a logic circuit in accordance with the following logic equation:

$$X = a_{11} \cdot \{(a_{00} + a_{10} + a_{01})(a_{21} + a_{12} + a_{22}) + (a_{10} + a_{20} + a_{21})(a_{01} + a_{02} + a_{12})\} + a_{01}a_{21}(a_{10} + a_{12}) + a_{10}a_{12}(a_{01} + a_{21})$$

The output of smoothing circuitry 208 is a serial bit stream which is applied to shift register 231, shifted therethrough, and applied to corner recognition and pairing circuitry 212 via a lead 210. The output of shift register 231 is transferred in parallel over bus 260 to the delay means 220D.

Figure 10:
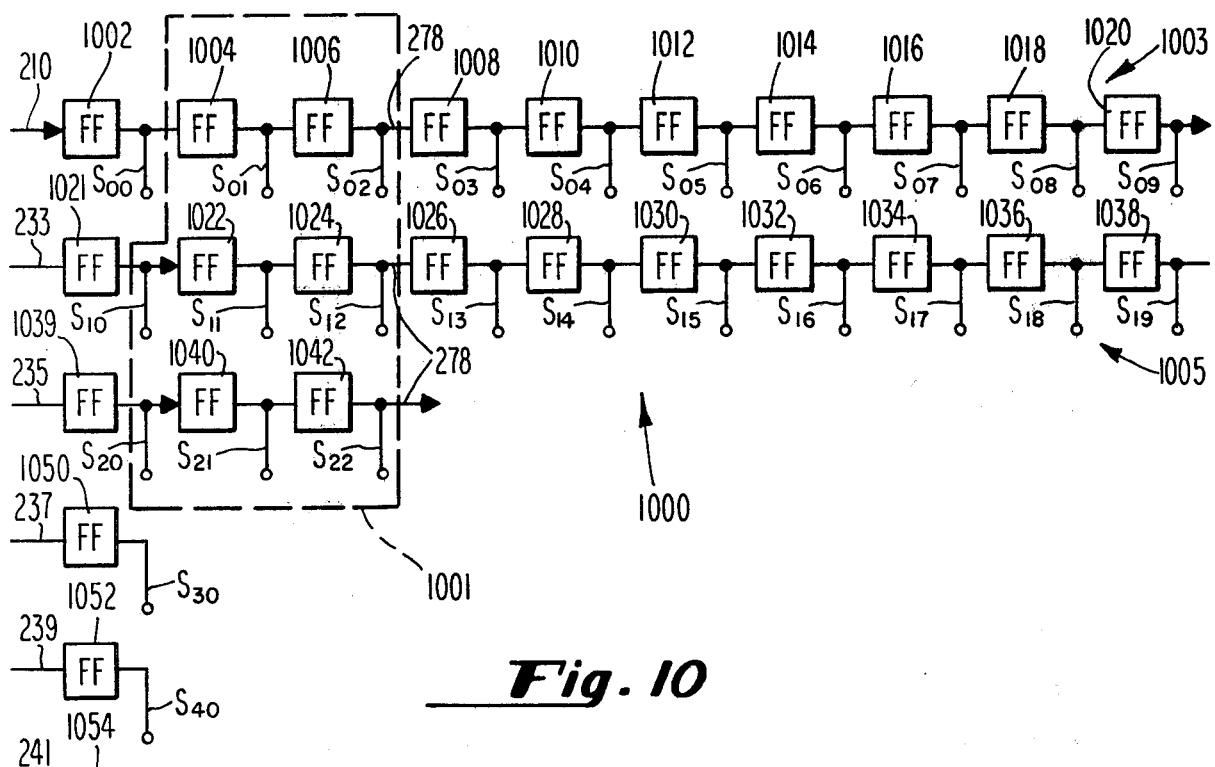
FIG. 10 is a block diagram of a combined array generator portion of the corner recognition and pairing and line/space width error detector circuit portions of FIG. 2.

As a result of the smoothing accomplished by smoothing circuits 204, 206 and 208, the effects of bearing noise, digitizing errors and shot noise (such errors represented by the pixel images 56 in FIG. 1) are removed. Referring now to FIG. 10, like the smoothing circuits, corner recognition and pairing circuitry 212 also includes an array generator comprised in part of a $3 \times 3$ array of single bit shift registers (D flip flops) like those shown in FIG. 6. See the array of single bit shift registers 1002, 1004, 1006, 1021, 1022, 1024, 1039, 1040, 1042. This array of registers cooperates with the serial/parallel shift register 231 and with the delay circuits 220D and 222D in FIG. 2 via leads 210, 233 and 235 to generate a $3 \times 3$ matrix of binary signals similar to that described earlier for FIG. 6. However, now the $3 \times 3$ array represents smoothed data. The remainder of the circuitry of FIG. 10 will be described later in connection with the line/space width error detection feature of the invention.

Figure 7:
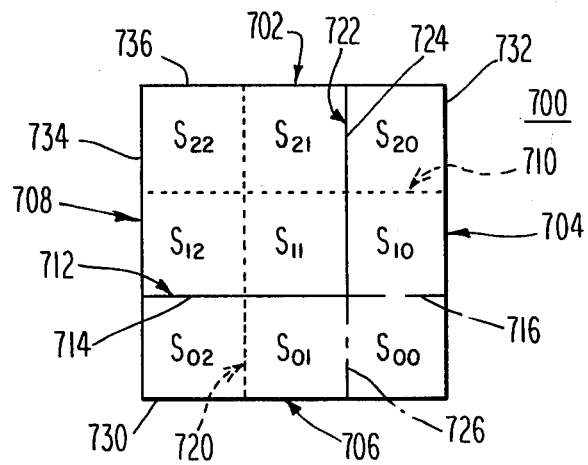
FIG. 7 represents a preferred embodiment pattern of output signals from selective delay means and an array generator portion of the corner recognition and pairing circuit of FIG. 2.
Figure 8:
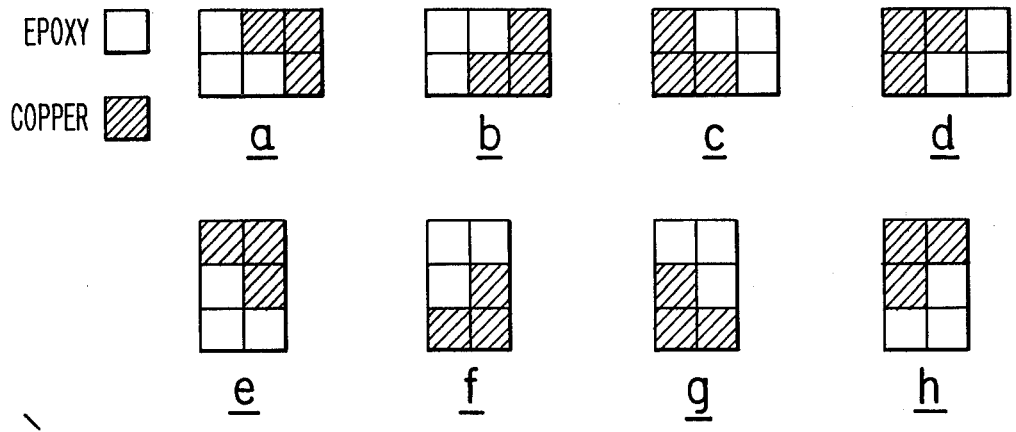
FIGS. 8a through 8h represent signal patterns used by the present invention.

It should be borne in mind that the $3 \times 3$ array of smoothed pixel signals generated within circuit 212 comprises nine pixel signals representing an area of nine square mils on the circuit board. In FIG. 7, the nine pixel signals, each representing one square having a square mil area, are represented by a 3×3 matrix designated generally 700 of pixel signals labeled $S_{ii}$. A 3×3 matrix can be thought of as three rows of elements, each row having three elements, or three columns of elements, each column having three elements. The matrix 700 comprises a square perimeter formed by the even numbered lines 702 through 708. The three rows of the matrix are formed by the spaces between the following parallel row lines: solid perimeter line 702; dotted line 710; and partially solid and partially dashed line 712, the line 712 having a solid portion 714 and a dashed portion 716; and solid perimeter line 706. The columns are formed by the spaces between the following parallel column lines which are perpendicular to the parallel row lines: solid perimeter line 708; dotted line 720; partially solid and partially dashed and dotted line 722, the line 722 further comprising a solid portion 724 and a dashed and dotted portion 726; and solid perimeter line 704.

Each of the nine squares formed within the 3×3 matrix 700 represents a binary signal present at one of the terminals of the array generator portion of circuit 212, that is, at the output of registers 1002, 1004, 1006, 1021, 1022, 1024, 1039, 1040 and 1042. FIG. 7 is arranged to show the positions of the pixel signals in the array as representative of real time when the path of the scanning beam is considered. For a scanning apparatus which scans from left to right and from top to bottom, the latest pixel signal generated by the scanning laser beam, after delay in the smoothing circuits previously described will appear from the terminal $S_{00}$ in the bottom row and in the right most column. The oldest pixel signal, from terminal 1042, is in the top row, left most column ($S_{22}$). Hereinafter, the double subscript notation $S_{ii}$ will be used interchangably to denote a terminal in the array generator or the corresponding pixel signal therefrom. An array of terminals comprising the array generator provides an array of signals.

Portions of the pixel signals of the 3×3 matrix 700 are combined together in a number of ways to form several different arrays of pixel signals which other arrays are used in the corner recognition and pairing circuitry. The largest of the arrays of signals, the corner array, includes all the pixel signals of the 3×3 matrix except for pixel signal $S_{00}$. See the terminals within dashed box 1001. The pixel signals of the corner array represent an area of the circuit board which area is circumscribed by row line 702; column line 708; a portion 730 of row line 706 lying between column line 708 and column line 722; a portion 732 of column line 704 lying between row line 702 and row line 712; dash dot line portion 726 and dash line portion 716.

The above described corner array of signals can be thought of as comprising three other arrays of pixel signals used by the corner recognition and pairing circuitry. These three other arrays are: a two row by three column horizontal rectangular array of pixel signals; a three row by two column vertical rectangular array of pixel signals; and a 2×2 subarray which comprises four pixel signals common to both the horizontal and vertical rectangular arrays. The horizontal rectangular array is circumscribed by the row lines 702 and 712; by a portion 734 of column line 708 lying between row line 702 and row line 712; and by a portion of column line 704 lying between row lines 702 and 716. The vertical rectangular array is circumscribed by column lines 708 and 722; by line portion 730 of row line 706 and by a portion 736 of row line 702 lying between column lines 708 and column line 722. Finally, the 2×2 subarray common to both the horizontal and vertical rectangular arrays is circumscribed by the line portions 736, 724, 734 and 714.

It should be borne in mind: that each pixel signal represents one square mil of an area on the surface of the circuit board illuminated by a laser light beam during a pixel clock interval; that an array of adjacent rows and columns of pixel signals formed from portions of the current and previous vertically adjacent laser scans and taken together represents an enlarged area of the circuit board equal to the number of pixel signals in an array (the array of pixel signals is formed using delay circuits and single bit shift registers); that, as the laser beam moves from left to right after each pixel clock pulse, the values of the pixel signals in the array of signals change and the area of the circuit board that the pixel signals represent changes and moves from left to right with the laser beam; that the conductor/substrate corner features (even numbers 30 through 36 and even numbers 40 through 46 in FIG. 1a) are described by unique pixel signal patterns such as those shown in FIGS. 4a through 4h respectively.

Figure 4:
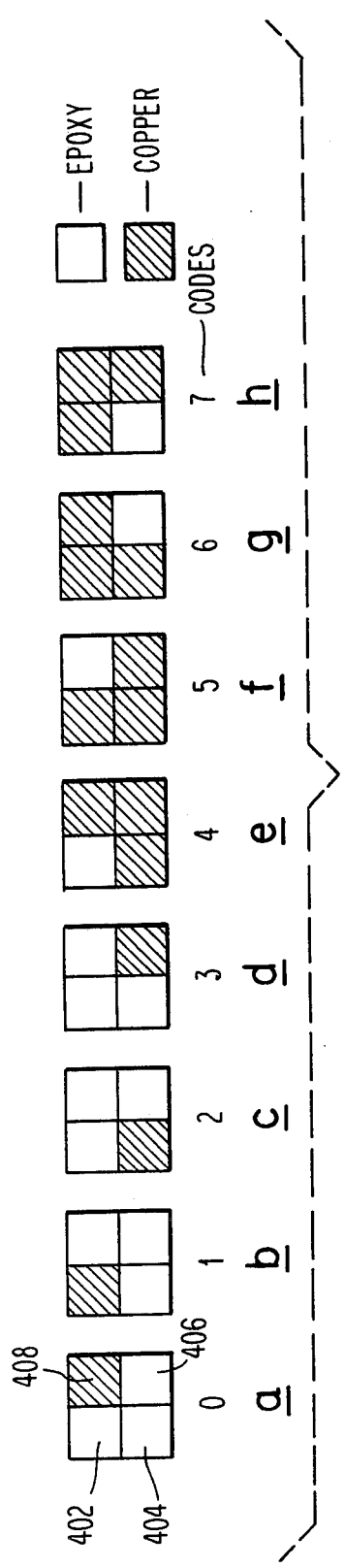
FIGS. 4a through 4h illustrate a plurality of conductor/substrate corner patterns and their codes.
Figure 9:
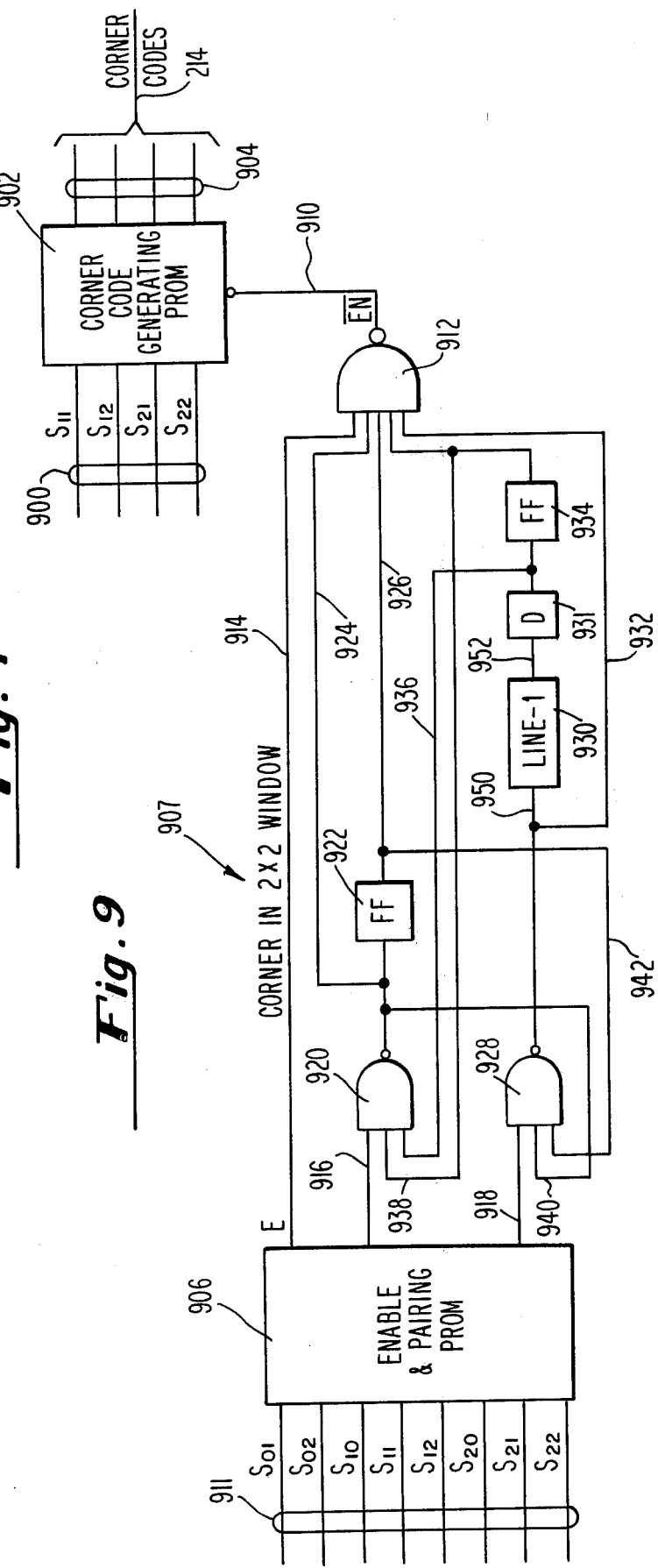
FIG. 9 is a more detailed block diagram of the corner code generating means and excess corner elimination means portions of the corner recognition and pairing circuit of FIG. 2.

Referring now to FIGS. 4a through 4h, each of the 2×2 subarrays of pixel signals shown in FIGS. 4a through 4h represent an area on the circuit board which includes a conductor/substrate corner feature. The blank squares represent high binary signals representing an area on the circuit board which comprises substrate. The shaded squares represent low binary signals which in turn represent a conducting area on the circuit board. FIG. 4a shows three of the squares 402, 404 and 406 as substrate while the upper right corner square 408 is shaded indicating conductor. This describes outer corner 30 in FIG. 1a. Close inspection of FIGS. 4a through 4h will show the correlation between the 2×2 pixel patterns of conductor/substrate corner features and the actual corner features even numbers 30-36 and 40-46 of FIG. 1a.

FIGS. 5a-5f and 15a-15f are diagrams which serve as an aid in understanding the operation of corner recognition and pairing circuitry 212. An image designated generally 500 and 1500 of a portion of a conductor is shown shaded in each of the FIGS. 5a-5f and 15a-15f. The image is that which might be created by the scanning apparatus and smoothing circuitry without the benefit of the corner recognition and pairing circuit 212. The pixel area 506 (1506) of the image is in error. The area defined by the corner array designated generally 514 (or 1514) is shown in various positions relative to the would-be image. The description which follows shows how the corner array is used to compensate for the error at pixel location 506 (1506). In FIGS. 5a-5f and 15a-15f the corner array is thought of as scanning the conductor image 500 (1500). In reality this does not happen. At any one time the only image of the circuit board available is that image provided by the array generator terminals in the form of an array of pixel signals such as the corner array of pixel signals.

In FIGS. 5a through 5f the would be image 500 of a portion of the conductor is shown against the background of a pixel map designated generally 502. The pixel map shows rows and columns of pixel squares 504, each square having an area of one square mil. It should be recalled that the laser scans from left to right and from top to bottom across the conducting pattern on the circuit board. The pixel clock of the scanning apparatus creates the pixel squares from the signals generated by the apparatus, the signals being generated in response to the laser beam impinging on the circuit board.

Because of various sources of error in the scanning apparatus, such as digitizing errors mentioned earlier, pixel space 506 would have been assigned a high binary value indicating substrate when it should have been assigned a low binary value indicating a conductor. In reality, the conductor has an outer corner such as the outer corner 30 in FIG. 1a. Instead, the scanning apparatus without circuit 212 would provide an image like the image 58 in FIG. 1b. Instead of one corner feature (and one conductor/substrate corner pattern) being present in the conductor image, three corners, 508, 510 and 512 would be present in the image. Corners 508 and 510 are horizontally adjacent corners while corners 510 and 512 are vertically adjacent corners. Further inspection of FIGS. 5a through 5f shows that the three corners 508, 510 and 512 result in three separate conductor/substrate corner patterns. The preprocessing circuitry of the present invention automatically eliminates two of the three corners leaving behind only one corner as it should be.

Horizontally adjacent and vertically adjacent corners have associated therewith horizontally and vertically adjacent corner patterns. FIGS. 8a-8h show the possible patterns that can occur.

FIGS. 5a through 5f also show the area of the circuit board imaged by the corner array of pixel signals designated generally 514 in FIGS. 5a through 5f. The corner array was defined earlier in connection with a description of FIG. 7. The corner array comprises: a 2×2 subarray 516 for providing conductor/substrate corner patterns; a 2×3 horizontal rectangular array (also described in connection with FIG. 7) formed by adding array portion 518 to subarray 516; and vertical rectangular array (described in FIG. 7) formed by adding portion 520 to subarray 516. The horizontal and vertical rectangular arrays are used to detect horizontally adjacent conductor/substrate corner pattern pairs or vertically adjacent conductor/substrate corner pattern pairs in a manner to be described below in connection with the description of FIGS. 5a through 5f.

Figure 5A:
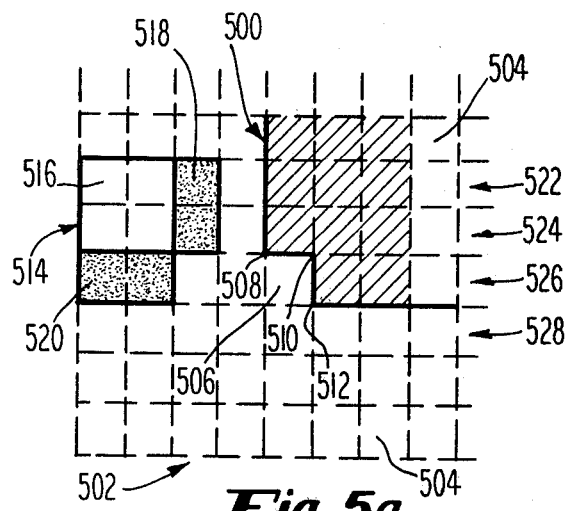
FIGS. 5a through 5f illustrate a first operation of the preferred embodiment of the present invention on a first portion of a printed circuit board.

Corner array 514 moves from left to right in FIGS. 5a through 5f following the scan of a laser beam. After each pixel clock, the corner array 514 moves one pixel location to the right. The corner array in FIG. 5a moves across the conductor image portion 500 along rows 522, 524 and 526 of pixels during a first sweep. Inspection of FIG. 5a, shows that the 2×2 subarray 516 does not include any of the corner patterns of FIGS. 4a-4h during the first sweep.

Figure 5B:
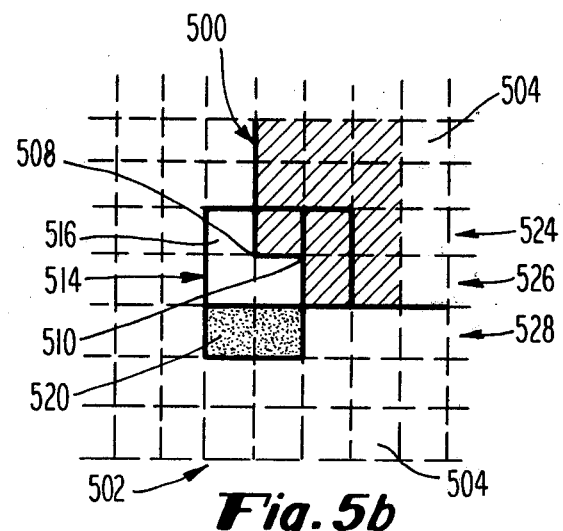

FIG. 5b shows the corner array during a second sweep vertically adjacent to the first sweep. Now the corner array follows rows 524, 526 and 528. In FIG. 5b, the 2×2 subarray includes a corner pattern associated with corner 508, that is, it contains the corner pattern shown in FIG. 4a. At the same time, however, in the horizontal rectangular array, a horizontally adjacent corner pattern pair appears. For example, the corner pattern associated with corner 508 (i.e. the corner pattern of FIG. 4a) and the corner pattern associated with corner 510 (i.e. the corner pattern of FIG. 4h) are both present within the horizontal rectangular array. Four different combinations of horizontally adjacent corner pattern pairs are possible with the eight separate corner features (FIGS. 4a-4h) recognizable by the present invention. These are shown in FIGS. 8a through 8d. Whenever, two horizontally adjacent conductor/substrate corner features such as corners 508 and 510 occur in the image of the circuit board, the horizontal rectangular array will contain at some time during the scan of the circuit board one of the patterns in FIGS. 8a through 8d.

Figure 5C:
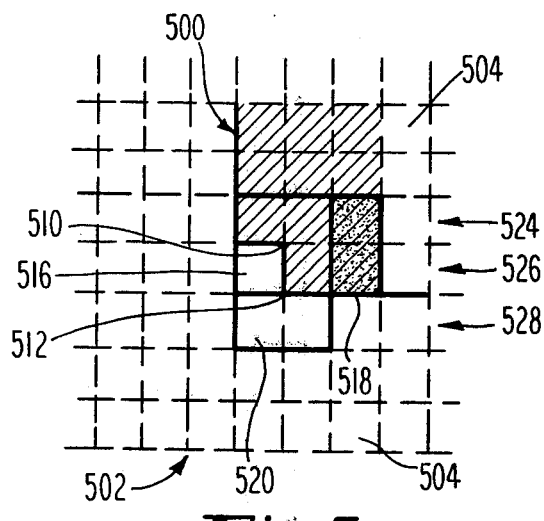

In a similar fashion, FIG. 5c shows the corner array of FIG. 5b displaced one pixel to the right. The corner array is still following a sweep along the rows 524, 526 and 528. Now the 2×2 subarray 516 includes the corner pattern of FIG. 4a associate with corner 510. At the same time, however, if one views the contents of the vertical rectangular array, a vertically adjacent corner pattern pair appears. For example the corner pattern associated with corner 510 (FIG. 4h) and the corner pattern associated with corner 512 (FIG. 4a) are both present within the vertical rectangular array. Four different combinations of vertically adjacent corner pattern pairs are possible. These are shown in FIGS. 8e through 8h. Whenever two vertically adjacent conductor/substrate corner features occur in the image of the circuit board, (such as corners 510 and 512), the vertical rectangular array will at some point during the scan contain one of the patterns in 8e through 8h.

Figure 5D:
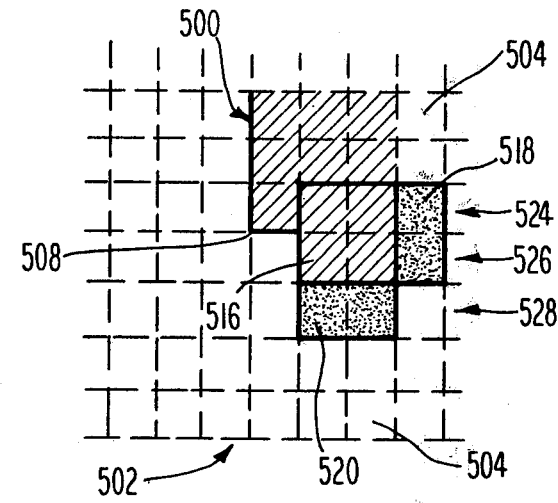

In FIG. 5d, the corner array of FIGS. 5b and 5c has moved one pixel to the right along the rows 524, 526 and 528. The 2×2 subarray 516 no longer contains a corner pattern corresponding to one of the patterns in FIGS. 4a through 4h.

Figure 5E:
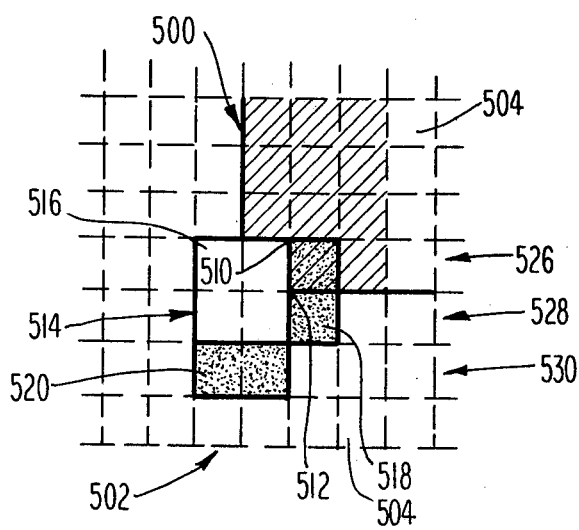
Figure 5F:
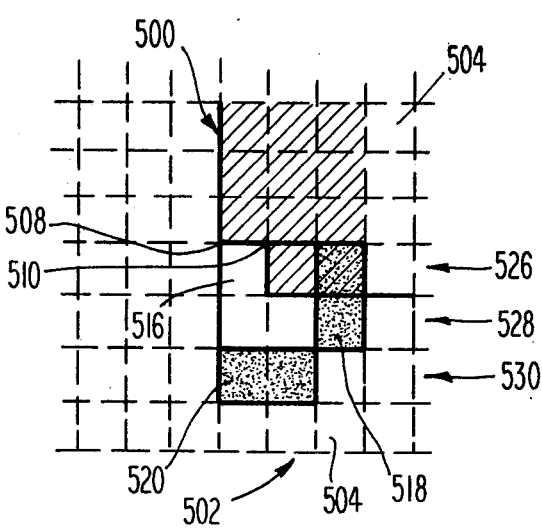

In FIG. 5e, the corner array is approaching the conductor image portion 500 during a third scan along rows 526, 528 and 530. The 2×2 subarray 516 does not yet include a corner pattern. In FIG. 5f, the corner array has moved to the right by one pixel and the 2×2 subarray 516 includes the corner pattern (FIG. 4a) associated with corner 512. Inspection of FIG. 5f shows that there are no horizontally adjacent or vertically adjacent corner pattern pairs such as those shown in FIGS. 8a through 8h present in either the horizontal rectangular array or vertical rectangular array of the corner array. Only the corner pattarn associated with corner 512 is present in the 2×2 subarray 516.

FIGS. 15a through 15f are similar in nature to FIGS. 5a through 5f. In FIGS. 15a through 15f, a conductor image portion designated generally 1500 is shown on a substrate. A pixel map 1502 and corner array 1514 are also shown and are similar to the pixel map and corner array of FIGS. 5a through 5f. The pixel map comprises pixel spaces 1504 and even numbered rows 1522 through 1530 of the pixels. The corner array 1514 comprises a 2×2 subarray 1516 with horizontal extention 1518 and vertical extention 1520 which extensions form the horizontal and vertical rectangular arrays, respectively, when added to the 2×2 subarray 1516.

Pixel location 1506 in FIGS. 15a through 15f should be a low binary signal indicating a conductor. Due to an error in the scanning mechanism, such as a digitizing error, pixel location 1506 would be assigned a high binary signal indicating substrate in the absence of circuit 212. As a result the image of the conductor would contain three corners, 1508, 1510 and 1512, instead of a single corner. See the image 62 in FIG. 1b. Each of the corners, 1508, 1510 and 1512, would generate a conductor/substrate corner pattern such as those found in FIGS. 4a through 4h.

Figure 15A:
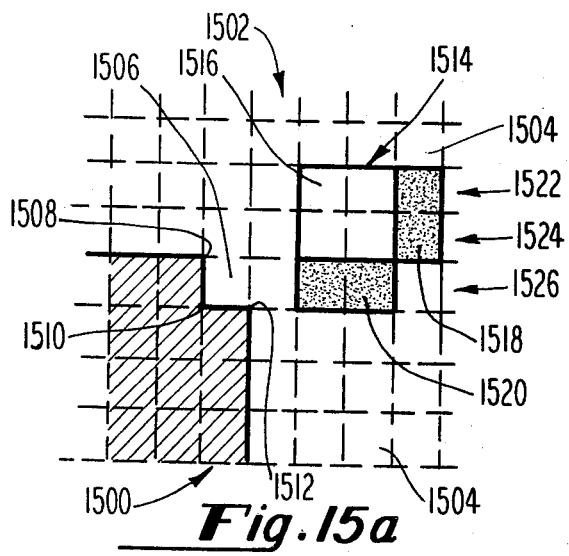
FIGS. 15a through 15f illustrate a first operation of the preferred embodiment of the present invention on a third portion of a printed circuit board.

In FIG. 15a the corner array 1514 is shown in a position after it has moved from left to right along a first scan. The first scan of the corner array follows the path along the rows 1522, 1524 and 1526. At no time during this scan did the 2×2 subarray 1516 contain a corner pattern such as those in FIGS. 4a through 4h.

Figure 15B:
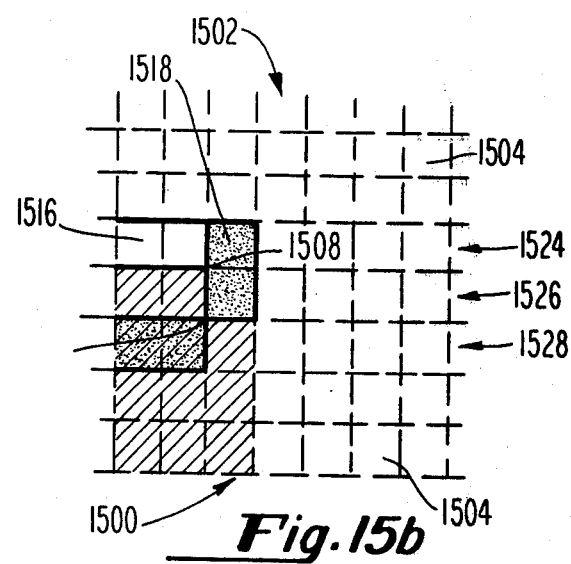
Figure 15C:
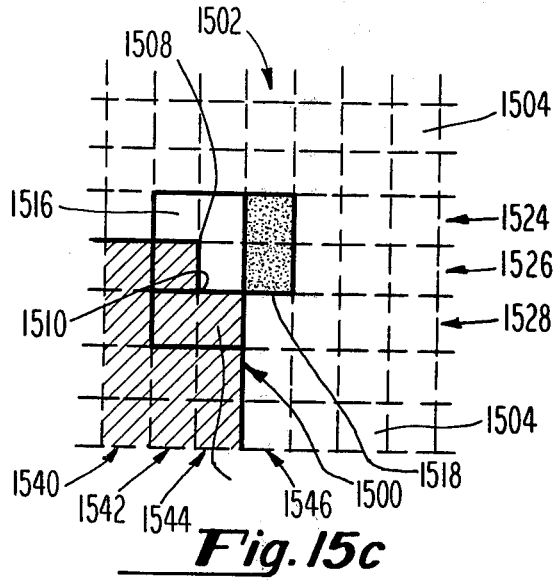

In FIG. 15b the corner array is moving along a second scan along the rows 1524, 1526 and 1528. In FIG. 15b, the 2×2 subarray 1516 does not yet include the corner pattern associated with corner 1508. However, in FIG. 15c the corner array has moved one pixel to the right and the 2×2 subarray 1516 now includes the corner pattern shown in FIG. 4c. At the same time, however, if one views the contents of the vertical rectangular array, a vertically adjacent corner pattern pair appears. For example, the corner pattern (FIG. 4c) associated with corner 1508 and the corner pattern (4f) associated with corner 1510 are both present within the vertical rectangular array. Inspection of FIG. 15c shows that this is the vertically adjacent corner pattern pair of FIG. 8g. No complementary horizontally adjacent corner pattern pair is present in the horizontal rectangular array. To accent this the array portion 1518 is shown shaded. As the corner array moves further to the right along rows 1524, 1526 and 1528, the 2×2 subarray 1516 will move away from the corner 1508 and no new corner pattern will appear within the subarray.

Figure 15D:
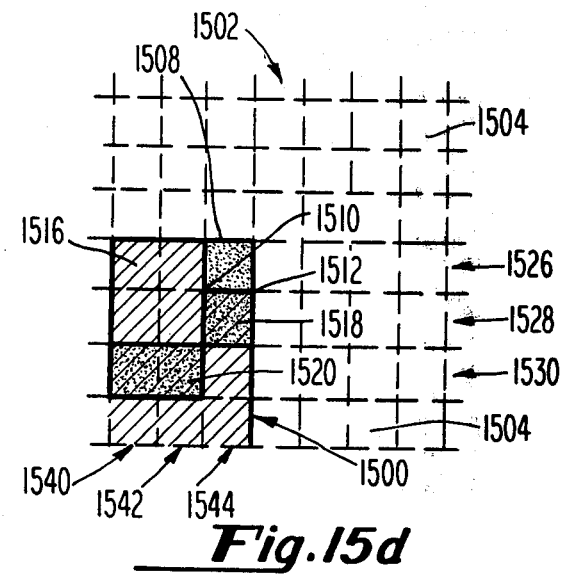
Figure 15E:
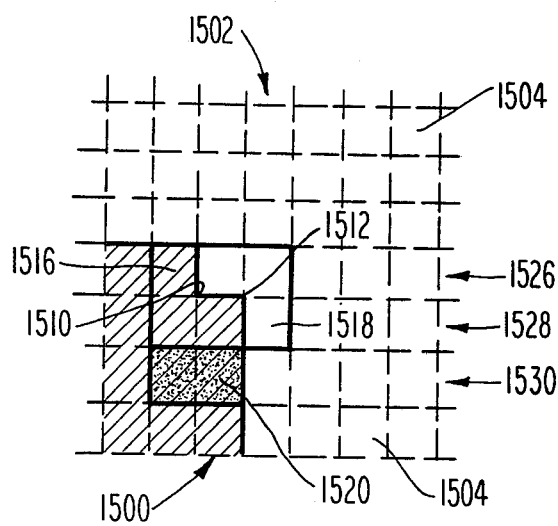

In FIG. 15d, a third sweep of the conductor portion 1500 by the corner array is underway along rows 1526, 1528 and 1530. The 2×2 subarray 1516 is shown positioned one pixel position ahead of the horizontal corner feature pair 1510 and 1512. In FIG. 15e the corner array has moved one pixel position to the right and the 2×2 subarray 1516 contains the corner pattern associated with corner 1510. The horizontal rectangular array contains a horizontally adjacent corner pattern pair such as that shown in FIG. 8c and associated with corner pair 1510 and 1512. There is no vertically adjacent corner pattern present in the vertical rectangular array and the portion 1520 is shown shaded.

Figure 15F:
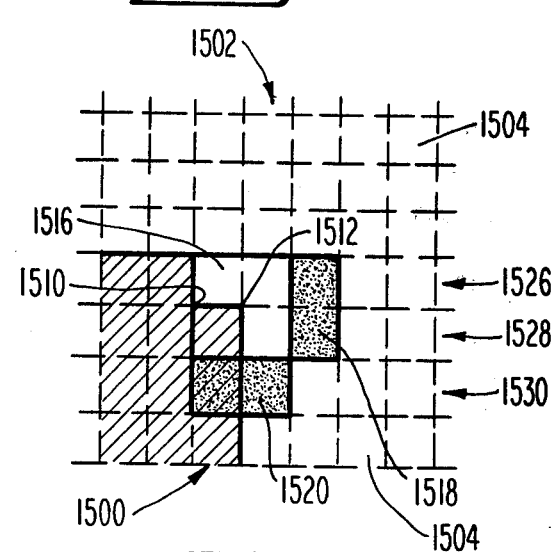

As the corner array moves one pixel position to the right relative to its position in FIG. 15e, the 2×2 subarray 1516 contains a corner pattern (FIG. 4c) associated with the corner feature 1512. Inspection of FIG. 15f shows that there is no horizontally or vertically adjacent, corner pattern contained in either the horizontal or vertical rectangular arrays.

The description of FIGS. 5a through 5f and FIGS. 15a through 15f illustrate that in generating an image of a conductor pattern by a scanning apparatus, a single pixel error located at the corner of a conductor can generate three corner patterns where there should only be one. Therefore, two of the corner patterns must be eliminated.

The corner array of the present invention has been designed to contain a single corner pattern in the 2×2 subarray; to contain a horizontally adjacent corner pattern pair in the horizontal rectangular array; and to contain a vertically adjacent corner pattern pair in the vertical rectangular array. In the vertically adjacent and horizontally adjacent corner pattern pairs, one of the corner patterns is always the corner pattern in the 2×2 subarray. As mentioned earlier, the 2×2 subarray is common to both the vertical and horizontal rectangular arrays. The information present in the various component arrays of the corner array is used by the corner recognition and pairing circuitry 212 to recognize corner patterns in the 2×2 subarray and generate a code corresponding thereto. The circuitry 212 also eliminates excess corner patterns generated by errors. In FIGS. 5a through 5f and 15a through 15f, two of the three corners must be eliminated and only one corner code transmitted for the remaining corner. The corner code is transmitted to a data utilization means such as a data processing unit along with information about the location of the corner on the printed circuit board. The data processing unit then checks the code and location against a predetermined list of corner codes and their locations to determine whether a conductor corner should be located there. It is possible that more than one pair of excess corners may occur. For example, see the corner image at 68 in FIG. 1B. In both these instances for example, only one corner code is transmitted from the circuitry 212 to the data utilization means. Referring now to FIGS. 5a through 5f and FIG. 9, FIG. 9 shows additional details of circuits within the corner recognition and pairing circuit 212. The four pixel signals $S_{11}$, $S_{12}$, $S_{21}$ and $S_{22}$, from the 2×2 subarray of the corner array are transmitted on bus 900 to PROM 902. The four signals identify a location in PROM 902 where a three bit word is stored. If a corner pattern is present in the 2×2 subarray then the word chosen at the location in PROM 902 defined by the four signal input will contain a four bit corner code associated with the pattern in the subarray. For example, the pattern of FIG. 4a with assigned Code 0000 is defined by $S_{11}$ equal to one; $S_{12}$ equal to one; $S_{21}$ equal to zero; and $S_{22}$ equal to one. The signal 1101 will select a location where the code 0000 is stored. In the preferred embodiment of the present invention only eight different corner patterns are possible (FIGS. 4a-4h) so only a three bit corner code is required. In general, however, more than eight patterns are possible requiring more than a three bit corner code.

Before the chosen code can be transmitted from PROM 902 via bus 904 an enable signal must be transmitted thereto from the excess code elimination circuit comprising enable and pairing PROM 906 and logic circuitry 907. PROM 902 is connected to the output of NAND gate 912 of logic circuit 907 by a lead 910. Logic circuitry 907 will only send a low enable signal to PROM 902 when a corner pattern is present in a 2×2 subarray and no adjacent corner pattern pair is present in either the horizontal or vertical rectangular arrays. To accomplish this, the output signals of the corner array (including the signals of the 2×2 subarray and the vertical and horizontal rectangular arrays) are transmitted via bus 911 to the PROM 906. These eight bits identify a location in PROM 906 which stores a three bit word. A selected three bit word is transmitted to logic circuit 907 via lines 914, 916 and 918 with each pixel clock. If a corner code is to be transmitted from PROM 902, all signals transmitted to NAND gate 912 will be high and a low signal will be transmitted via lead 910 to PROM 902 thereby enabling it. If a corner code is not to be transmitted because a corner pattern pair is present in either the vertical or horizontal rectangular array then at least one low signal will be transmitted to NAND gate 912 and a high signal will be transmitted to PROM 902 disabling the output. The logic circuit 907 operates in response to the three bit output of PROM 906.

Lead 914 is connected directly between PROM 906 and NAND gate 912. This signal will be high whenever the 2×2 subarray of pixel signals ($S_{11}$, $S_{12}$, $S_{21}$, $S_{22}$) contains a corner pattern as defined by FIGS. 4a through 4h. Otherwise, the signal on line 914 will be low.

Lead 916 from PROM 906 is connected to the three input NAND gate 920. Whenever a horizontally adjacent corner pattern pair is present in the horizontal rectangular array of the corner array (pixel signals $S_{10}$, $S_{11}$, $S_{12}$, $S_{20}$, $S_{21}$ and $S_{22}$) the signal on lead 916 is high. Otherwise, it is low. The output of NAND gate 920 is transmitted via lead 940 to NAND gate 928; via lead 924 to output NAND gate 912; and to a D flip-flop 922. Flip-flop 922 is clocked by the pixel clock pulses 1403 and acts as a single pixel delay. The output of flip-flop 922 is the same as the input to the flip-flop 922 which occurred one pixel clock earlier. The output of flip-flop 922 is transmitted over lead 926 directly to output NAND gate 912 and via lead 942 to the three input NAND gate 928.

Along with the outputs of NAND gate 920 and flip-flop 922, PROM 906 provides an input to NAND gate 928 via lead 918. The output of PROM 906 on lead 918 is high whenever a vertically adjacent corner pattern pair is present in the vertical rectangular array ($S_{01}$, $S_{02}$, $S_{11}$, $S_{12}$, $S_{21}$, $S_{22}$). When all the inputs to NAND gate 928 are high, the NAND gate 928 output is low. The output of NAND gate 928 is transmitted directly to NAND gate 912 via lead 932 and to delay circuit 930.

Binary signals from NAND gate 928 are shifted into special delay circuit 930 with each pixel clock. Special delay circuit 930 comprises a serial/parallel shift register 234 and delay circuit 220X as illustrated in FIG. 2. Except for the differences in addressing discussed earlier, register 234 and delay circuit 220X are identical in operation to register 302 and delay circuit 220A. Because of the special addressing of the delay circuit 220X, signals entering special delay circuit 930 are shifted by one line scan minus eight pixels, i.e., they are delayed by one line scan and shifted to the left by eight pixels. Consider the following sequences of read/write addresses applied to the RAM of special delay circuit 930:

$N/N-2$; $N+1/N-1$; $N+2/N$

Note as mentioned before that the first occurring read address is two more than the following write address. Consider further the eight sequential signals which occur at the output of PROM 906 on lead 918 during the $N-1$ write address and the $N+2$ read address during scan line X. Those eight signals, called B, are written into the RAM of special delay circuit 930 at the following write address, N. During scan line $X+1$, at read address N (Preceeding write address $N-2$), the eight signals, B, are transferred to the output parallel/serial register of the special delay circuit 930. During the $N-2$ write address and $N+1$ read address the eight signals, B, are transmitted serially from the parallel/serial register. This interval (the $N-2$ write and $N+1$ read address interval) on scan line $X+1$ is one scan line minus one byte (eight signals) later than the $N-1$ write and $N+2$ read interval of scan line X when the eight signals, B, first occurred at the output of PROM 906.

The output of special delay circuit 930 is applied to the input of a seven pixel delay circuit 931. Hence, the output of circuit 931 are pixel signals delayed by one scan line minus one pixel from when they occurred at the input to circuit 930. The output of circuit 931 is applied to D flip-flop 934 and to NAND gate 920 via lead 936. The output of flip-flop 934 is applied directly to NAND gate 912 and to NAND gate 920 via lead 938.

Flip-flop 934 delays its input by one pixel, therefore, its output is the same as the input to special delay circuit 930 which occurred one scan line earlier.

During a first scan by corner array 514 along rows 522, 524 and 526 in FIG. 5a, no corner pattern or adjacent corner pattern pair is present in the corner array. Special delay circuit 930 is loaded with high binary signals or ones during this portion of the scan shown in FIG. 5a.

Referring now to FIG. 5b, during a second scan by corner array 514 along rows 524, 526 and 528, the 2×2 subarray 516 contains a corner pattern corresponding to that of FIG. 4a associated with corner 508. The horizontal rectangular array contains horizontally adjacent corner patterns (corresponding to FIG. 8a) while no adjacent corner pattern pair is present in the vertical rectangular array. Array portion 520 which forms part of the vertical rectangular array is shown shaded since it is not used in the corner array position shown in FIG. 5b.

FIG. 4a shows that corner pattern 4a is assigned code zero. Accordingly, the PROM 902 will generate code zero and PROM 906 will provide a high signal on line 914 and line 916. A low signal will be provided on line 918. The signals on leads 936 and 938 connected to NAND gate 920 will also be high since during the previous first scan by the corner array across and in the vicinity of the conductor portion 500 of FIG. 5a, ones were loaded into special delay circuit 930. Now, at the position illustrated in FIG. 5b on the second scan line of the corner array across the conductor portion 500, high level signals (ones) are transmitted from the special delay circuit 930 since ones were loaded into circuit 930 during the previous scan by the corner array at this general region of the scan. Hence at the position illustrated in FIG. 5(b), the signals on leads 936, 938 and 916 are all high. Therefore, the output of NAND gate 920 is low causing NAND gate 912 to transmit a high signal to PROM 902. This disables PROM 902 and the code zero associated with corner 508 will not be transmitted.

In FIG. 5c, one pixel clock later, the subarray 516 contains the corner pattern for corner 510. See FIG. 4h. At the same time, the vertical rectangular array contains the vertical pair of FIG. 8e. No horizontal corner pattern is present and array portion 518 is shown shaded. When the corner array is in the position of FIG. 5c, the signals on bus 900 address PROM 902. PROM 906 produces high signals on lines 914 and 918. A low signal is present on line 916 which low signal causes the output signal of NAND gate 920 to go high. However, during the previous clock pulse when the corner array contained a pattern as illustrate in FIG. 5b, the output signal of NAND gate 920 was low. Now during the present clock pulse when the pattern in the corner array is as illustrated in FIG. 5c, the output of flip-flop 922 is low. This low signal is transmitted over line 926 to NAND gate 912 causing PROM 902 to be disabled. Therefore, the corner code for corner 510 will not be transmitted from PROM 902 at this time.

With the output of flip-flop 922 being low, the inputs to NAND gate 928 do not contain all high signals. Therefore, the output of NAND gate 928 remains high even though the output signal of PROM 906 on lead 918 is high with the pattern contained in the corner array as illustrated in FIG. 5c. Therefore, during this portion of the line scan of the corner array over the conductor portion 500, high signals or ones are loaded into circuit 930. This will be important to an understanding of the operation of logic circuitry 907 during the next line scan.

In FIG. 5e the corner array 514 is about to scan the conductor image portion 500 during a third line scan of the corner array along rows 526, 528 and 530. No corner pattern or adjacent corner pattern is present in the corner array at the position illustrated in FIG. 5e. The output signals of NAND gate 920 and flip-flop 922 are high. The outputs on leads 936 and 938 are also high since during the previous line scan by the corner array high signals were loaded into the delay means 930. Now, with the corner array at the position illustrated in FIG. 5f, a corner pattern is present in 2×2 subarray 516. See FIG. 4a. This will address the PROM 902 to generate a code zero. There is no adjacent corner pattern present in either the horizontal or vertical rectangular arrays and the array portions 518 and 520 are shown shaded. The signals on lines 916 and 918 are low and the outputs of NAND gates 920 and 928 are high. Because the output of NAND gate 920 was high during the previous clockpulse, the output of flip-flop 922 is high with the corner array at the position illustrated in FIG. 5f. Similarly, the signals on leads 936 and 938 are also high. Therefore, all inputs to NAND gate 912 are high providing a low enable signal on lead 910 to PROM 902. This enables PROM 902 so that the addressed corner code zero is read from PROM 902 onto bus 904.

The description provided above of the operation of logic circuitry 907 and PROMS 902 and 906 in conjunction with the description of FIGS. 5a through 5f illustrates how the corner recognition and pairing circuitry eliminates excess corner codes such as those caused by digitizing errors in the scanning apparatus.

FIGS. 15a–15f illustrate another mode of operation of the logic circuitry 907 and the need for special delay circuit 930.

Because of an error in the scanning apparatus, pixel location 1506 would be assigned a high binary signal when it should have been low when crossing the conductor image 1500. As a result, three corner features 1508, 1510 and 1512 are present in the image of the conductor instead of one corner feature.

Examination of FIG. 15a shows that during a first sweep by the corner array of the circuit board along rows 1522, 1524 and 1526, no corner patterns or adjacent corner pattern pairs are present within the corner array. Hence, during this portion of the first sweep in the proximity of conductor portion 1500, high signals or ones are loaded into delay circuit 930.

FIG. 15b shows the corner array during a second sweep along rows 1524, 1526 and 1528. The 2×2 subarray is approaching corner 1508 but has not yet reached it. At this point, the signals on leads 936, 938, 940 and 942 in logic circuitry 907 are all high. The signals on leads 936 and 938 are high because during the first sweep, high signals were loaded into circuit 930 in the vicinity of conductor portion 1500.

FIG. 15c shows the corner array at the pixel location adjacent the position illustrated in FIG. 15b. The corner array is located at pixel columns 1542, 1544 and 1546. The 2×2 subarray contains a corner pattern associated with the corner feature 1508. See FIG. 4c. The vertical rectangular array contains an adjacent corner pattern pair. See FIG. 8g. Accordingly, the subarray signals address a location in PROM 902 which stores corner codes. A high signal is present on lead 914; a low signal on lead 916; and a high signal on lead 918. With a low signal on line 916, the output of NAND gate 920 is high. The output of flip-flop 922 is high because the output of NAND gate 920 was high during the previous clock pulse. Hence, all inputs to NAND gate 928 are high. NAND gate 928 provides a low signal which is loaded into special delay circuit 930. Note that the zero is being loaded when the corner array is at column positions 1542, 1544 and 1546 in FIG. 15c. Since NAND gate 928 generates a low signal for this position of the corner array, a low signal is transmitted over lead 932 to NAND gate 912 and this prevents an output from PROM 902.

During a third line scan, corner array 1514 has moved to the column positions 1540, 1542 and 1544 in FIG. 15d. This places the corner array one scan line of pixels minus one pixel beyond the position of the corner array in FIG. 15c. No corner or adjacent corner patterns are present in the corner array. However, the signal on lead 936 is zero since a zero was loaded into delay means 930 with the corner array at the position illustrated in FIG. 15c. The signals on leads 938, 940 and 942 are all high at this time. Remember that circuit 931 in combination with circuit 930 provides an output signal delayed by one scan line minus on pixel.

In FIG. 15e, the corner array has moved to the right by one pixel location. The 2×2 subarray contains a corner pattern associated with corner feature 1510. See the corner pattern of FIG. 4f. The horizontal rectangular array contains the adjacent corner pattern of FIG. 8c. There is no corner pattern pair present in the vertical rectangular array and array portion 1520 is shown shaded. A corner code, associated with the pattern of FIG. 4f, is addressed in PROM 902.

A high signal is present on lead 914; a high signal on lead 916; and a low signal on lead 918. The signal on lead 938 is low since the signal on lead 936 was low one clock pulse earlier. The low signal on lead 938 is transmitted to NAND gate 912 which in turn disables the PROM 902 and the corner code associated with corner 1510 is not transmitted.

A high signal on lead 916 would ordinarily result in a low signal being generated by NAND gate 920. However, the signal on lead 938 is low and this forces the output of NAND gate 920 high.

In FIG. 15f the corner array has moved one pixel location further to the right from the position illustrated in FIG. 15e. The 2×2 subarray contains a pattern associated with corner 1512. See corner pattern 4c. The subarray signals address a location in PROM 902 that stores a code 2. There is no adjacent corner pattern pair present in either the vertical or horizontal rectangular arrays. Accordingly, a high signal is generated on lead 914; a low signal on lead 916; and a low signal on lead 918. The low signal on lead 916 causes the output of NAND gate 920 to go high and that provides a second high signal to NAND gate 912. The output of NAND gate 920 was high during the previous clock pulse, so the output of flip-flop 922 is high now. This provides a third high signal to NAND gate 912. The output of flip-flop 934, which was low the clock pulse before goes high since only one low signal was loaded into circuit 930 during the previous second line scan by the corner array. The signal on lead 938 provides a fourth high signal to NAND gate 912. Finally, since the output of PROM 906 on lead 918 is low, the output of NAND gate 928 is high and this provides the fifth high signal to NAND gate 912. PROM 902 is therefore enabled and the corner code for corner 1512 is transmitted.

From the above description, it is seen that the logic circuitry 907 connected to PROMs 906 and 902 cooperates with PROM 906 to eliminate excess corners and provides an enable signal to PROM 902 allowing it to transmit the corner code for any remaining single corner. The above circuitry will operate for a series of corners like those shown at 60 and 68 in FIG. 1b. Several corner features are eliminated from corner feature pairs until only one corner feature is left.

In addition to recognizing the corners of conducting patterns and eliminating excess corner pairs due to scanning apparatus errors, the preprocessing apparatus monitors the width of conducting strips on the circuit board and the width of substrate strips occurring between parallel and spaced apart conducting strips. Referring to FIG. 1a, the widths of the conductor strips 14 and 16 and the width of the substrate or space strips 15 therebetween are required to meet a predetermined specification. For example, it is usually required that the conductor and space strip widths always equal or exceed a predetermined minimum width. If the conducting and space strips do not substantially meet the requirement, then the circuit board is considered to contain a flaw at the location where the minimum width is not met.

The preprocessing apparatus 200 of applicant's invention further comprises a line/space width error detector means for monitoring the width of conducting and space strips and for generating an error signal when the strips fall below a predetermined minimum value. A more detailed description of the line/space width error detector follows.

Referring first to FIG. 2, delay circuits 220D and 222 (D-K) are connected in series via the odd numbered leads 263 through 277 respectively. The delay circuits are also connected in parallel to the corner recognition and pairing circuit 212 and the line/space width error detector 218 over the odd numbered leads 233 through 249. Lines of binary signals transmitted to the serial/-parallel shift register 231 from the smoothing circuit 208 pass through the delay circuits 220D and 222 (D-K) in a manner as described in connection with FIG. 3. In FIG. 3, only two delay circuits 220A and 222A were connected in series. However, in FIG. 2 the delay circuits 220D and 222 (D-K) represent nine delay circuits connected in series. The output signals of the delay circuits on odd numbered leads 233 through 249 represent a vertical linear array of pixel signals which pixel signals represent a vertical linear image of the circuit board spread over nine scan lines of the laser beam across the circuit board, the nine scan lines preceeding the current scan line by the laser beam across the circuit board.

Referring now to FIG. 10, an array of single bit shift registers designated generally 1000 and associated output terminals are shown. The single bit shift registers are D flip-flops clocked by the pixel clock. The output terminals of the single bit shift registers are labeled $S_{ij}$ written with double subscript notation in a manner similar to the labeling used in FIG. 7. It should be remembered that the array of flip-flops within the dotted lines 1001 belong to the corner recognition and pairing circuitry 212 and they provide the corner array of output terminals described in connection with FIG. 7.

The array 1000 of single bit shift registers comprises: a first linear array of single bit shift registers designated generally 1003 including the even numbered shift registers 1002 through 1020. The corresponding output terminals are labeled $S_{00}$ through $S_{09}$. The array 1000 further comprises a second linear array of single bit registers designated generally 1005 including register 1021 and the even numbered single bit shift registers 1022 through 1038 having corresponding output terminals $S_{10}$ through $S_{19}$. Array 1000 further comprises three single bit registers 1039, 1040 and 1042 with output terminals $S_{20}$, $S_{21}$ and $S_{22}$ respectively. Lead 210 from shift register 231 is connected to the input of register 1002; lead 233 from delay circuit 220D, to the input of register 1021; and lead 235 from delay circuit 222D to the input of register 1039. Finally, array 1000 includes even numbered single bit shift registers 1050 through 1062 having corresponding output terminals $S_{30}$ through $S_{90}$. Odd numbered leads 237–249 from delay circuits 222 (E–K), respectively, are connected to the inputs of registers 1050 through 1062, respectively. Taken together, the array of single bit shift registers 1000 and their respective output terminals provide a diagnostic array of output terminals which includes the corner array of FIG. 7. It further comprises two parallel horizontal linear arrays of terminals, namely $S_{00}$ through $S_{09}$ and $S_{10}$ through $S_{19}$, and a vertical linear array of terminals $S_{00}$ through $S_{90}$.

As pixel signals advance through each single bit register in line array 1003 or 1005, they are delayed by one pixel clock pulse. This means that a binary signal present at terminal $S_{09}$, for example, was present at terminal $S_{00}$ nine clock pulses earlier. The pixel signals simultaneously present at the ten output terminals $S_{00}$ through $S_{09}$ represent ten horizontally adjacent pixel signals along the current scan line of the printed circuit board. The pixel signals present at terminals $S_{10}$ through $S_{19}$ represent ten horizontally adjacent pixel signals along the previous scan line. The pixel signals $S_{10}$ through $S_{19}$ are vertically adjacent to pixel signals $S_{01}$ through $S_{09}$, respectively.

Figure 11:
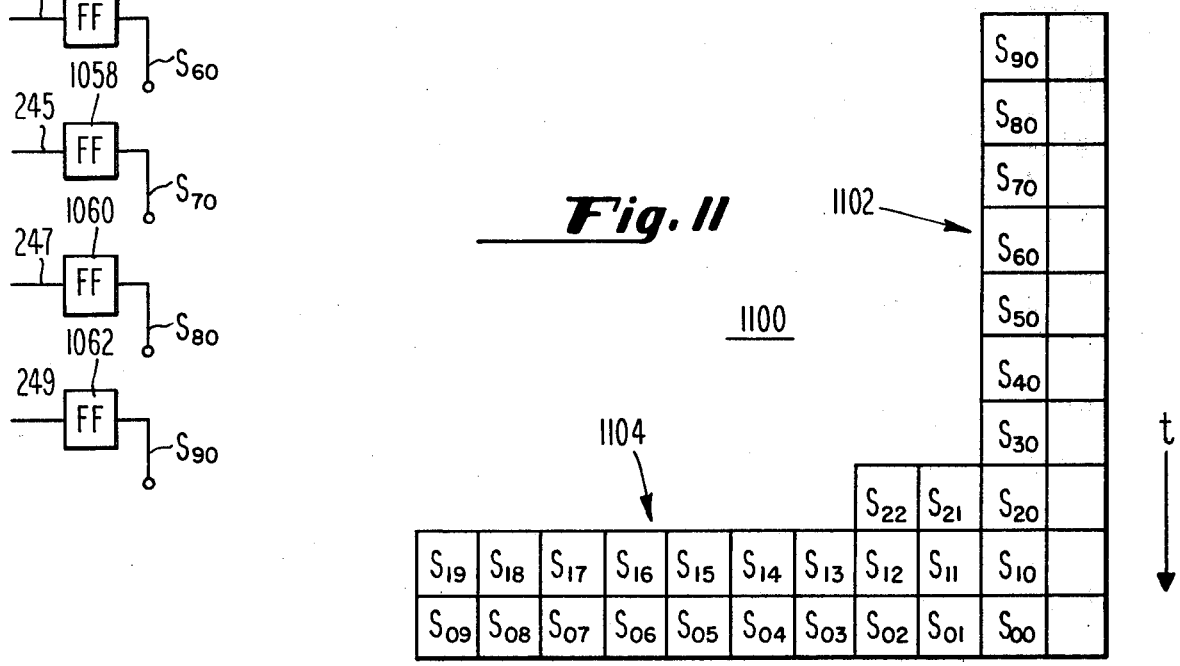
FIG. 11 represents a preferred embodiment pattern of output signals from selective delay means and the combined array generator portion of FIG. 10.

The pixel signals at the diagnostic array of terminals is shown designated generally 1100 in FIG. 11. The pixel signals are arrayed in real-time representative of the path being followed by the scanning laser beam. For example, for a laser beam scanning left to right and top to bottom, the most current pixel signal reaching array 1000 (after being delayed at shift registers 302, 223, 227 and 231 and smoothing circuits 204, 206 and 208) would occur at the bottom right most pixel location, $S_{00}$. Pixel location $S_{70}$, for example, in the vertical linear array of pixels designated generally 1102 represents a pixel signal vertically aligned with the most current pixel $S_{00}$ but occurring seven scan lines earlier. Similarly, pixel $S_{07}$ in the first horizontal linear array designated generally 1106 represents a pixel signal occurring seven clock pulses earlier than the most current pixel, $S_{00}$. Pixel signal $S_{17}$ in the second horizontal linear array designated generally 1104 is a pixel location vertically adjacent pixel $S_{07}$ but occurring during the previous scan line.

Referring to FIGS. 2 and 10, the lines of pixel signals in sequential format arriving over lead 210 from serial/-parallel shift register 231 pass through the single bit shift registers 1002, 1004 and 1006 which form part of the corner recognition and pairing circuitry 212. From here the pixel signals (in sequential format) are transmitted over one lead of bus 278 to the even numbered single bit shift registers 1008 through 1020 which are part of the line/space width error detection circuitry 218. Similarly, pixel signals in line sequential format from the delay circuit 220D over lead 233 pass through the single bit shift registers 1021, 1022 and 1024 within corner recognition and pairing circuitry 212 after which they propagate over another lead of bus 278 to the even numbered single bit shift registers 1026 through 1038 within the line/space width error detection circuitry 218. Finally, binary signals in line sequential format from delay circuit 222D propagate over lead 235 through single bit registers 1040 and 1042 in the corner recognition and pairing circuitry 212 and then propagate over a third lead of bus 278 to the line/space width error detection circuitry 218.

Figure 13A:
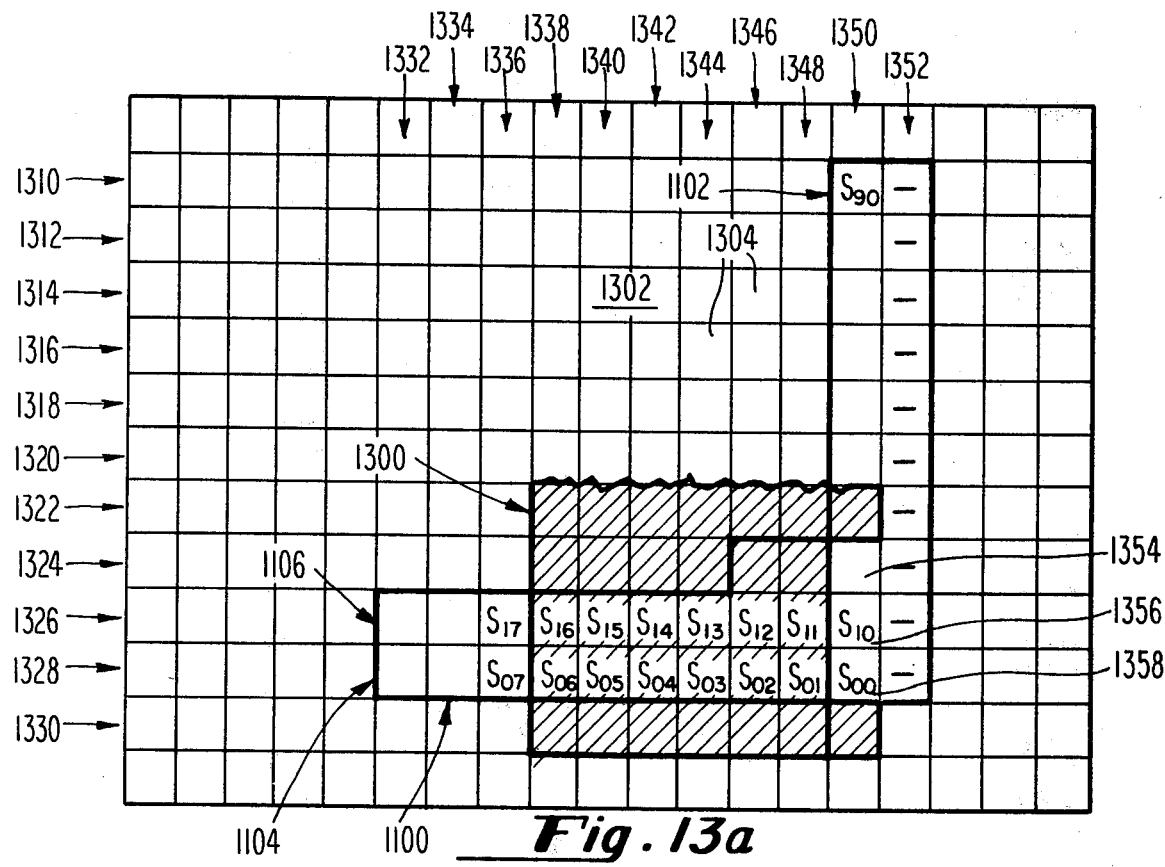
FIGS. 13a and 13b illustrate a second operation of the preferred embodiment of the present invention on a second portion of a printed circuit board.

Before describing the logic circuitry portion of line/space width error detection circuit 218, the significance of the diagnostic array of output terminals and pixel signals of FIG. 11 will be discussed in relation to FIGS. 13a and 13b. In the preferred embodiment of applicant's invention, the minimum width of conducting strips is seven mils and the minimum width between conducting strips (the minimum width of the space strip 15) is eight mils. FIG. 13a shows an image of a portion of a conducting strip designated generally 1300 which image would be generated by operation of the smoothing circuits and corner recognition and pairing circuit 212 if the output of these circuits were displayed cumulatively. In reality they never are. FIG. 13a shows the conductor image 1300 against the background of a pixel map 1302 like that used in FIGS. 5a–5f and 15a–15f. The pixel map comprises individual pixels 1304 and represents a pixel image of the circuit board including the conducting strip image 1300. The pixel map comprises rows and columns of adjacent pixels. FIG. 13a also shows the area of the printed circuit board covered by the diagnostic array 1100 of pixel signals of FIG. 11. After each pixel clock, the pixels in the diagnostic array change in value, the change representing a new image of the circuit board. For a laser beam scanning from left to right, with each pixel clock, the diagnostic array moves one pixel to the right. In FIG. 13a, the diagnostic array is shown fixed in pixel columns even numbers 1332 through 1352 as it moves from left to right along pixel rows even numbers 1310 through 1328.

In rows 1322 and 1330, strip 1300 is seven mils wide which is the minimum acceptable width. However, in rows 1324, 1326 and 1328, the conducting strip is only six mils wide. See pixels 1354, 1356 and 1358 in column 1350. When the diagnostic array is in the position in FIG. 13a relative to the conducting strip 1300, the pixel signal pairs $S_{00}$, $S_{07}$ and $S_{10}$, $S_{17}$ located in the horizontal linear array of pixels 1104 and 1106 respectively will each be at a high binary signal level indicative of the presence of substrate. At the same time, all the pixel signals in between $S_{00}$ and $S_{07}$ and in between $S_{10}$ and $S_{17}$ will be low binary signals indicative of a conductor.

Figure 13B:
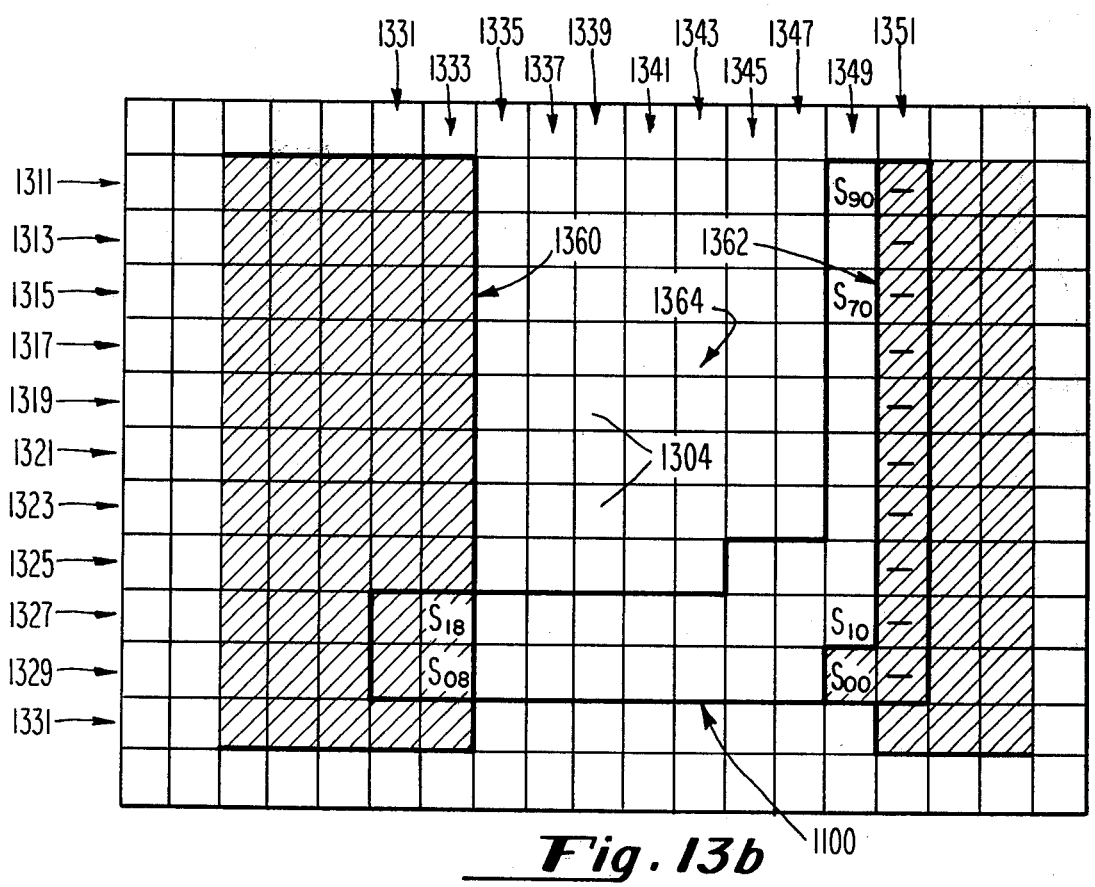

In FIG. 13b, which is similar in nature to FIG. 13a, the diagnostic array designated generally 1100 is shown in odd numbered pixel columns 1331 through 1351 as it moves from left to right along odd numbered pixel rows 1311 through 1331, the movement occurring with each pixel clock. Two would-be images of conducting strip portions designated generally 1360 and 1362 are shown separated by a space strip region designated generally 1364. In general, the conducting strip portions 1360 and 1362 are separated by eight mils eight pixels). However, in row 1329 the space strip (or separation between conducting portions 1360 and 1362) is only seven mils. The pixel signals $S_{00}$ and $S_{08}$ indicate conduction while the intermediate pixels, $S_{01}$–$S_{07}$, indicate substrate. In the second horizontal linear array of pixels, $S_{18}$ indicates a conductor while $S_{10}$ through $S_{17}$ indicate substrate.

Figure 12:
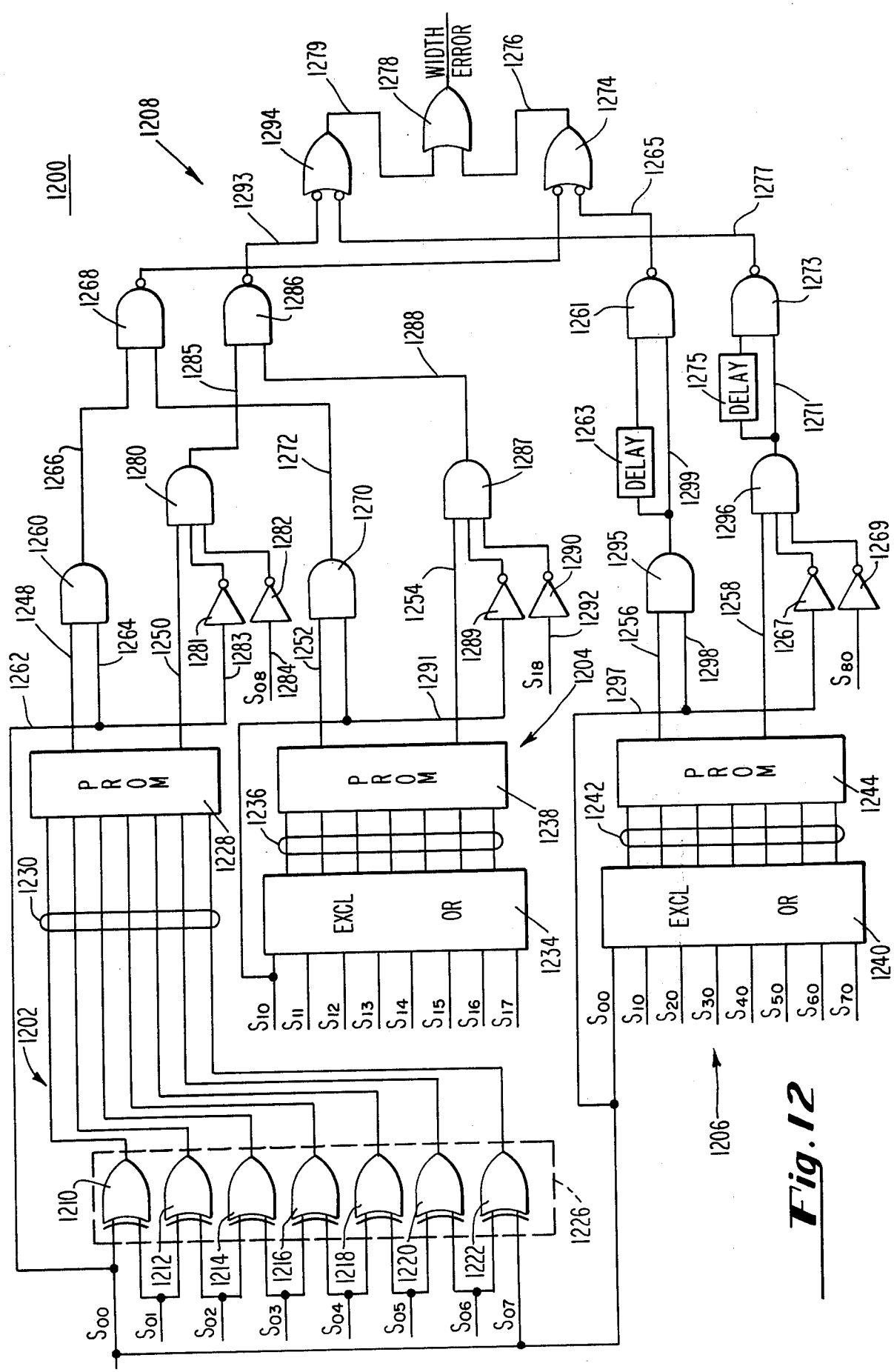
FIG. 12 is a more detailed block diagram of a strip width detector portion of the line/space width error detector portion of FIG. 2.

FIG. 12 shows in detail a detector and error signal circuit portion designated generally 1200 of the line/space width error detector circuit 218 of FIG. 2, which portion 1200 is connected to the diagnostic array of output terminals of FIG. 10. Portion 1200 comprises three separate but identical transition detector circuits designated generally 1202, 1204 and 1206, and a single combination logic circuit portion designated generally 1208.

Each of the transition detector circuits comprises a plurality of Exclusive OR (XOR) gates and a PROM. In the preferred embodiment there are seven XOR gates such as the even numbered gates 1210–1222 within the dotted box 1226 of the transition circuit 1202. The outputs of the XOR gates are connected to a PROM 1228 via a seven-lead address bus 1230. The eight pixel signals $S_{00}$ through $S_{07}$ for the first horizontal linear array of single bit shift registers 1003 in FIG. 10 are provided as inputs to the XOR gates of the transition detector circuit 1202. The corresponding terminals are connected as follows: $S_{00}$ to gate 1210; $S_{01}$ to gate 1210 and gate 1212; $S_{02}$ to gate 1212 and gate 1214 and so on. Terminal $S_{06}$ is connected to gate 1220 and gate 1222. Terminal $S_{07}$ provides the other input to gate 1222.

The XOR gates of transition detector circuit 1204, represented by box 1234, are connected via the seven lead address bus 1236 to PROM 1238. The XOR gates of transition detector circuit 1206, represented by box 1240, are connected via address bus 1242 to PROM 1244.

Terminals $S_{10}$ through $S_{17}$ from the second horizontal linear array 1005 of FIG. 10 are connected to XOR gates 1234 in a manner similar to the connection of the terminals $S_{00}$ through $S_{07}$ to the XOR gates 1226. Finally, the terminals $S_{00}$ through $S_{70}$ are connected to the XOR gates 1240 in the same manner as the connection between the terminals $S_{00}$ through $S_{07}$ to the XOR gates 1226.

The eight pixel signals $S_{00}$ through $S_{07}$ transmitted to XOR gates 1226 (1210–1222) represent an eight mil wide image of a portion of the circuit board, the image lying along or in the direction of a scan line. If the portion of the circuit board being imaged is all substrate then all pixel signals will be high signals. The seven bit output signals of the XOR gates 1226 will then be all zeros. If the eight mil portion of the circuit board being imaged is conductor then all the pixel signals will be low, but the seven bit output signals of the XOR gates 1226 will still be all zeros because of the truth table of the XOR. However, any transition between conductor and substrate will cause adjacent pixel signals at the transition to be of different states, that is, one high and one low. For each transition occurring within the eight mil portion of the circuit board being imaged by the eight adjacent pixel signals, the XOR gates 1226 will provide a high signal or a one in the seven bit output. This is true since any two adjacent pixel signals (within the eight adjacent pixels $S_{00}$ through $S_{07}$) having different binary states (one and zero) will cause one of the XOR gates 1210–1222 to provide a high output signal. The same is true for the transition detector circuit 1204 (input signals $S_{10}$ through $S_{17}$ and XOR gates 1234) and transition detector circuit 1206 (input signals $S_{00}$–$S_{70}$ and XOR gates 1240).

PROM 1228 is connected to combination logic circuit 1208 via the output leads 1248 and 1250. Each location within PROM 1228 stores a two bit word and one of these words is selected each pixel interval by an address on bus 1230. The two bit word selected by a particular set of address signals is transmitted to the logic circuit 1208 via the leads 1248 and 1250 after each pixel clock signal. In the preferred embodiment, if one and only one of the leads of bus 1230 (regardless of which one) transmits a high signal to PROM 1228, then a high signal is transmitted over lead 1250 and a low signal over lead 1248. In other words, for every combination of signals sent over bus 1230 containing a single high signal, PROM 1228 will transmit a two bit output word having a high signal on lead 1250 and a low signal on lead 1248. A single high signal within the eight pixel signals $S_{00}$ through $S_{07}$ indicates one transition between conductor and substrate within the eight mil image represented by the pixel input signals $S_{00}$ through $S_{07}$. If two high signals are present on the bus 1230 (indicating two transitions) then the output signal on lead 1248 is high and the output on lead 1250 is low. If there are no transitions present within the eight mil image, (all low signals on bus 1230) then there are low signals on both output leads 1248 and 1250.

Exclusive OR circuits 1234 and 1240, and PROM's 1238 and 1244 function in the same manner as Exclusive OR circuit 1226 and PROM 1228. PROM 1238 generates a high signal on lead 1254 and a low signal on lead 1252 for a single transition occurring within the image represented by pixel signals $S_{10}$ through $S_{17}$ and generates a high signal on lead 1252 and a low signal on lead 1254 for two transitions occurring. PROM 1244 generates a high signal on lead 1258 and a low signal on lead 1256 for a single transition occurring within the pixel image represented by pixel signals $S_{00}$ through $S_{70}$, and generates a high signal on lead 1256 and a low signal on lead 1258 for two transitions.

Referring now to FIG. 13a, horizontal linear array portions 1104 and 1106 are shown intersecting the conductor strip portion 1300 in pixel rows 1326 and 1328. Generally, the strip meets the seven mil wide minimum requirement. See rows 1322 and 1330, and the even numbered columns 1338 through 1350. However, in rows 1324, 1326 and 1328, the conductor strip is only six mils wide. See the blank pixel spaces 1354, 1356 and 1358 in column 1350. The blank pixel spaces indicate substrate while shaded pixel spaces indicate conductor. In horizontal array 1104, pixel signals $S_{00}$ and $S_{07}$ are high binary signals representing substrate, while pixel signals $S_{01}$ through $S_{06}$ are low binary signals indicating conductor. For the conducting portion 1300 in FIG. 13a, it is desirable to generate an error signal to indicate that the minimum width requirement for a conducting strip has been violated.

Within the eight mils covered by pixel signals $S_{00}$ through $S_{07}$, two transitions occur. One occurs between pixel signals $S_{00}$ and $S_{01}$ and the other between $S_{06}$ and $S_{07}$. Hence, in FIG. 12, lead 1248 will be high and lead 1250, low. Lead 1248 is connected to AND gate 1260. The other input to AND gate 1260 is from terminal $S_{00}$ via leads 1262 and 1264. Inspection of FIG. 13a shows that pixel signal $S_{00}$ is high and therefore AND gate 1260 transmits a high signal over lead 1266 to NAND gate 1268. Similarly, within the eight mils covered by pixel signals $S_{10}$ through $S_{17}$ in FIG. 13a, two transitions occur, one between $S_{10}$ and $S_{11}$ and the other between $S_{16}$ and $S_{17}$. Accordingly, in FIG. 12, lead 1252, connected to AND gate 1270, will be high. The other input to AND gate 1270 is from pixel terminal $S_{10}$ which is also high. See FIG. 13a. Hence, AND gate 1270 transmits a high signal over line 1272 to NAND gate 1268. Since the other input to NAND gate 1268 is high, NAND gate 1268 transmits a low signal to NOR gate 1274. NOR gate 1274 is connected via lead 1276 to OR gate 1278. If any input to NOR gate 1274 is low, it will transmit a high signal which in turn will be transferred to OR gate 1278. A high signal from OR gate 1278 acts as an error signal.

Note the two inputs to NAND gate 1268. With the combination logic circuitry of the present invention, it is necessary that the minimum width defect of conducting portion 1300 be present in the eight pixel image of both the horizontal linear array 1104 and 1106 simultaneously. If, for example, pixel signal $S_{10}$ were shaded indicating conductor, then AND gate 1270 would not be enabled and this in turn would disable NAND gate 1268. No error signal would be transmitted even though the minimum width requirement of conducting portion 1300 was violated within a single pixel row scan. But this represents a flaw which is only one mil long. Thus, in the preferred embodiment, in order to avoid transmitting an error signal for relatively small flaws which can be tolerated in actual practice the error detection circuit is designated such that it is necessary that flaw exist over at least a two mil length in order for the circuit to produce an error signal.

Referring now to FIG. 13b and FIG. 12, the horizontal linear array portions 1104 and 1106 of the diagnostic array are shown spanning the space strip portion 1364 and overlaying the conducting portions 1360 and 1362 on either side thereof. The linear array portions 1104 and 1106 are located in pixel rows 1327 and 1329 respectively. In general, the space strip 1364 meets the minimum width requirement of eight mils in odd numbered rows 1311 through 1327 and row 1331. However, in row 1329, pixel signal $S_{00}$ and pixel signal $S_{08}$ indicate conductor (that is, they are low signals), and the substrate strip 1364 is only seven mils wide in row 1329 (pixel signals $S_{01}$ through $S_{07}$).

Within the pixel signals $S_{00}$ through $S_{07}$, only one transition occurs between pixel signals $S_{00}$ and $S_{01}$. Therefore, in FIG. 12, PROM 1228 transmits a high signal on lead 1250 and a low signal on lead 1248. Lead 1250 is connected to three input AND gate 1280. The other two inputs are from inverters 1281 and 1282. Pixel terminal $S_{00}$ is connected via lead 1283 to inverter 1281 while pixel terminal $S_{08}$ is connected via lead 1284 to inverter 1282. In FIG. 13b, pixel signals $S_{00}$ and $S_{08}$ are low and inverters 1281 and 1283 provide two other high signals to AND gate 1280 in response thereto. The three high signals cause AND gate 1280 to transmit a high signal over lead 1285 to NAND gate 1286.

FIG. 13b, pixel signal $S_{10}$ is a high signal (substrate) and signal $S_{18}$ is low (conducting). There are no transitions within the pixels $S_{10}$–$S_{17}$ so the output signals from PROM 1238 are both low on leads 1252 and 1254. Lead 1254 is connected to AND gate 1287 whose output is the remaining input to NAND gate 1286 over lead 1288. Remember the other input to AND gate 1286 from AND gate 1280 is high. The other two inputs to AND gate 1287 are from inverters 1289 and 1290. Terminal $S_{10}$ is connected to inverter 1289 via lead 1291 and terminal $S_{18}$ is connected to inverter 1290 via line 1292.

Since the signal on lead 1254 is low, AND gate 1287 transmits a low signal over lead 1288 disabling NAND gate 1286. If pixel signal $S_{10}$ had been a low signal indicating conductor (space strip 1364 would have a width of seven mils in pixel row 1327 as well as 1329) then PROM 1238 would provide a high signal over line 1254. Pixel signals $S_{10}$ and $S_{18}$ would both be low. This would provide three high input signals to AND gate 1287 (because of the inverters 1289 and 1290) resulting in a high signal to NAND gate 1286. Since the other input to NAND gate 1286 was also a high signal, a low signal would be transmitted over lead 1293 to NOR gate 1294. In response, NOR gate 1294 would transmit a high signal over lead 1295 to OR gate 1278. OR gate 1278 would then transmit a high error signal.

Although not illustrated in FIGS. 13a and 13b, the horizontal linear array of pixels 1104 and 1106 cooperate with the transition detector circuits 1202 and 1204 and logic circuit 1208 of FIG. 12 to generate an error signal whenever vertically directed conducting or space strips fall below a predetermined minimum value along a predetermined minimum length (2 mils) of the strips. Transition detector circuit 1206 in combination with logic circuit 1208 performs a similar function for horizontally directed conducting and space strips when the strips are intercepted by the vertical array of pixel signals 1102. For example, when the eight pixel signals $S_{00}$ through $S_{70}$ intercept a horizontally disposed conducting strip with a minimum width of less than seven mills, then at some point during the scan of the circuit board by the diagnostic array, pixel signals $S_{00}$ and $S_{70}$ will both be high signals indicating substrate.

At the same time, two transitions between conductor and substrate will occur within the eight pixel image of the conductor, for example, between $S_{00}$ and $S_{10}$ and $S_{60}$ and $S_{70}$. When this occurs, PROM 1244 in FIG. 12 generates a high signal on lead 1256 connected to AND gate 1295 and a low signal on lead 1258 to AND gate 1296. Pixel signal $S_{00}$ is connected to AND gate 1295 via leads 1297 and 1298. The two high signals to AND gate 1295 generate a high signal on lead 1299 to NAND gate 1261. At the same time, the output of AND gate 1296 is transmitted to a D flip-flop 1263 which operates to delay its input by one pixel clock. The output of D flip-flop 1263 is connected to the other input of NAND gate 1261. NAND gate 1261 will only transmit a low signal if both inputs are high. This will only occur if (1) two transitions occur within the pixel image $S_{00}$ through $S_{70}$; and (2) pixel $S_{00}$ remains high for two sequential pixel clock pulses (since D flip-flop 1263 acts as a delay of its input from one clock pulse). The added circuit 1263 provides the same function as the second horizontal linear array of pixel signals $S_{10}$ through $S_{19}$ and the second transition detection circuitry 1204. It insures that an error signal is only generated if a minimum width requirement of a horizontally directed conducting strip is violated over a two mil length.

The output of NAND gate 1261 is applied over lead 1265 to NOR gate 1274. If the output of NAND gate 1261 is low then NOR gate 1274 generates a high signal on lead 1276 which passes through OR gate 1278 as an error signal.

By analogy to FIG. 13b, if the vertical linear array of pixels 1102 of the diagnostic array intercepts a substrate strip formed between two parallel but spaced apart conducting strips, where the substrate strip has a minimum width less than eight mils, then pixel signals $S_{00}$ and $S_{80}$ must be some point both be low. At the same time, within the pixel signals $S_{00}$ through $S_{70}$ a single transition between conductor and substrate will occur. For this situation, in FIG. 12, PROM 1244 generates a high signal on line 1258 and a low signal on line 1256.

The high signal is transmitted to AND gate 1296 which has two other inputs from inverters 1267 and 1269. Pixel terminal $S_{00}$ is connected to inverter 1267 while pixel terminal $S_{80}$ is connected to inverter 1269. For the situation where $S_{00}$ and $S_{80}$ are both low (indicating conductor) and where the output on lead 1258 is high, AND gate 1296 will receive three high signals and transmit a high signal on lead 1271 to NAND gate 1273. At the same time AND gate 1296 will transmit a high signal to a D flip-flop 1275. D flip-flop performs the same function as flip-flop 1263 described earlier. Assuming that the minimum width defect of the substrate strip under investigation exists over a length of over two mils or more, NAND gate 1273 generates a high signal over lead 1277 to NOR gate 1294. A low signal to NOR gate 1294 is transmitted as a high signal over lead 1279 and passes through OR gate 1278 as an error signal.

To summarize the operation of the line/space width error detector circuit, the circuit of FIG. 12 in cooperation with the diagnostic array of FIG. 11 generates an error signal for narrow conducting strips when two transitions between conductor and substrate are detected within seven preselected adjacent pixel signals of either the horizontal or vertical linear arrays and whenever a preselected end one of the seven adjacent pixel signals is a high binary signal indicating substrate. An error will be generated for narrow substrate strips formed between parallel but spaced apart conducting strips when a single transition is detected within eight preselected adjacent pixels of either the horizontal or vertical linear array and when a preselected end one of the eight adjacent pixel signals is high along with a ninth pixel adjacent the eight adjacent pixels and opposite the preselected end one.

The present invention is applicable to circuit boards where minimum width requirements for the conducting strips and substrates strips differ from that of the preferred embodiment described herein. Furthermore, the invention is readily suitable for use in analyzing the surface features of objects other than printed circuit boards, either for analyzing the width of features of a pattern on the surface of the object or analyzing corner features of a pattern.

While the present invention has been disclosed in connection with the preferred embodiment thereof, it should be understood that there may be other embodiments which fall within the spirit and scope of the invention as defined by the following claims.

What is claimed is:

1. A preprocessing circuit for recognizing a plurality of different conductor/substrate corner features present in a plurality of lines of binary signals representing a conductor pattern present on a printed circuit board, said lines of binary signals generated by a scanning apparatus which scans said printed circuit board in a plurality of row scans, there being a plurality of scan clock pulses during each of said row scans, said plurality of scan clock pulses being associated with said binary signals in each of said plurality of lines of binary signals, said binary signals also containing various errors, said errors comprising horizontally or vertically adjacent corner feature pairs, said preprocessing circuit comprising:

arraying means for providing a corner array of output signals formed from said binary signals in portions of a plurality of adjacent row scans, said arraying means providing a separate corner array of output signals associated with each of said plurality of scan clock pulses;

corner code generating means connected to said arraying means for receiving a plurality of selected ones of each of said corner array of output signals and for generating corner code signals associated with said corner features when said plurality of selected ones of each of said corner array of output signals indicates the presence of one of said corner features therein and for transmitting said corner code signals in response to an enable signal;

excess corner feature elimination means connected to said arraying means and to said corner code generating means for disabling transmission of said corner code signals when any of said horizontally adjacent or vertically adjacent corner feature pair includes said corner feature indicated by said selected ones of said corner array whereby at least one excess corner feature is eliminated;

a plurality of row delay means each storing a row scan of binary signals and each providing at an output terminal a row shifted output signal whereby said plurality of delay means provides a plurality of row shifted output signals from a plurality of adjacent row scans;

a plurality of column delay means coupled to each of said output terminals of said row delay means for providing a plurality of column shifted output signals associated with each of said row scans;

said arraying means comprises:

serial/parallel register means for converting said lines of binary signals into lines of byte wide binary signals;

said row delay means comprises:

memory means for storing substantially a row scan of byte wide binary signals; and parallel/serial register means connected to the output terminals of said memory means, said parallel/serial register means for converting said lines of byte wide binary signals to lines of sequential binary signals.

2. The preprocessing circuit of claim 1 wherein said arraying means further comprises:

a parity generator connected to the output terminals of said serial/parallel register means for adding parity bits to said lines of byte wide binary signals; and parity detector circuitry connected to the output terminals of said memory means for checking the parity of said lines of byte wide binary signals.

3. Preprocessing circuitry for analyzing a plurality of lines of sequential binary signals, said lines generated by a scanning apparatus which scans a printed circuit board having a conducting pattern formed on a substrate, said conducting pattern comprising a plurality of conducting strips and space strips formed between parallel and spaced apart conducting strips, said scanning apparatus scanning said printed circuit board in a plurality of substantially parallel row scans, therebeing a plurality of scan clock pulses during each of said row scans, said plurality of scanning clock pulses being associated with said binary signals in each of said plurality of lines of binary signals, said preprocessing circuitry comprising:

arraying means for providing a diagnostic array of output signals formed from said binary signals in portions of a plurality of adjacent row scans, said arraying means providing a different diagnostic array of output signals associated with each of said plurality of scanning clock pulses, said diagnostic array having first and second substantially orthogonal linear array portions;

a line/space width error detection means connected to said arraying means for receiving the output signals of said first and second substantially orthogonal linear array portions of said diagnostic array for detecting when the width of said conducting strips and space strips is less than a predetermined minimum value;

at least one transition detection means associated with each of said first and second substantially orthogonal linear array portions of said diagnostic array of output signals for receiving a selected plurality of adjacent output signals of said associated linear array portion and for detecting the number of changes in state in adjacent binary signals of said selected plurality of adjacent output signals;

combination logic means connected to said at least one transition detection means and disposed to receive said first and second substantially orthogonal linear array portions for generating an error signal in response to selected combinations of the signals received from said at least one transition detection means and said first and second substantially orthogonal linear array portions;

a plurality of exclusive OR (XOR) gates connected in parallel to said selected plurality of adjacent output signals; and at least one memory means connected to the output terminals of said plurality of XOR gates.

4. Preprocessing circuitry for analyzing a plurality of lines of sequential binary signals, said lines generated by a scanning apparatus which scans a printed circuit board having a conducting pattern formed on a substrate, said conducting pattern comprising a plurality of conducting strips and space strips formed between parallel and spaced apart conducting strips, said scanning apparatus scanning said printed circuit board in a plurality of substantially parallel row scans, therebeing a plurality of scan clock pulses during each of said row scans, said plurality of scanning clock pulses being associated with said binary signals in each of said plurality of lines of binary signals, said preprocessing circuitry comprising:

arraying means for providing a diagnostic array of output signals formed from said binary signals in portions of a plurality of adjacent row scans, said arraying means providing a different diagnostic array of output signals associated with each of said plurality of scanning clock pulses, said diagnostic array having first and second substantially orthogonal linear array portions;

a line/space width error detection means connected to said arraying means for receiving the output signals of said first and second substantially orthogonal linear array portions of said diagnostic array for detecting when the width of said conducting strips and space strips is less than a predetermined minimum value;

at least one transition detection means associated with each of said first and second substantially orthogonal linear array portions of said diagnostic array of output signals for receiving a selected plurality of adjacent output signals of said associated linear array portion and for detecting the number of changes in state in adjacent binary signals of said selected plurality of adjacent output signals;

combination logic means connected to said at least one transition detection means and disposed to receive said first and second substantially orthogonal linear array portions for generating an error signal in response to selected combinations of the signals received from said at least one transition detection means and said first and second substantially orthogonal linear array portions; and means producing an error signal when the binary signal from at least a preselected end one of said selected plurality of adjacent output signals indicates the presence of substrate and said at least one transition detection means detects two and only two changes in state in said selected plurality of adjacent output signals.

5. Preprocessing circuitry for analyzing a plurality of lines of sequential binary signals, said lines generated by a scanning apparatus which scans a printed circuit board having a conducting pattern formed on a substrate, said conducting pattern comprising a plurality of conducting strips and space strips formed between parallel and spaced apart conducting strips, said scanning apparatus scanning said printed circuit board in a plurality of substantially parallel row scans, therebeing a plurality of scan clock pulses during each of said row scans, said plurality of scanning clock pulses being associated with said binary signals in each of said plurality of lines of binary signals, said preprocessing circuitry comprising:

arraying means for providing a diagnostic array of output signals formed from said binary signals in portions of a plurality of adjacent row scans, said arraying means providing a different diagnostic array of output signals associated with each of said plurality of scanning clock pulses, said diagnostic array having first and second substantially orthogonal linear array portions;

a line/space width error detection means connected to said arraying means for receiving the output signals of said first and second substantially orthogonal linear array portions of said diagnostic array for detecting when the width of said conducting strips and space strips is less than a predetermined minimum value;

at least one transition detection means associated with each of said first and second substantially orthogonal linear array portions of said diagnostic array of output signals for receiving a selected plurality of adjacent output signals of said associated linear array portion and for detecting the number of changes in state in adjacent binary signals of said selected plurality of adjacent output signals;

combination logic means connected to said at least one transition detection means and disposed to receive said first and second substantially orthogonal linear array portions for generating an error signal in response to selected combinations of the signals received from said at least one transition detection means and said first and second substantially orthogonal linear array portions; and means producing an error signal when the binary signal from at least a preselected end one of said selected plurality of adjacent output signals and at least one binary signal from said linear array portion associated with said selected plurality of adjacent output signals and adjacent to said selected plurality at an end opposite said at least a preselected end one indicates conductor, and said at least one transition detection means indicates one and only one change in state in said selected plurality of adjacent output signals.

* * * * *